United States Patent
Brendel et al.

(10) Patent No.: US 9,197,543 B2
(45) Date of Patent: *Nov. 24, 2015

(54) FULLY DISTRIBUTED ROUTING OVER A USER-CONFIGURED ON-DEMAND VIRTUAL NETWORK FOR INFRASTRUCTURE-AS-A-SERVICE (IAAS) ON HYBRID CLOUD NETWORKS

(71) Applicant: Cisco Technology, Inc., San Jose, CA (US)

(72) Inventors: Juergen Brendel, Auckland (NZ); Christopher C. Marino, Mill Valley, CA (US); Patrick Amor, Menlo Park, CA (US); Pritesh Kothari, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,017

(22) Filed: Jan. 9, 2014

(65) Prior Publication Data

US 2014/0126418 A1 May 8, 2014

Related U.S. Application Data

(63) Continuation of application No. 13/365,245, filed on Feb. 2, 2012, now Pat. No. 8,660,129.

(51) Int. Cl.
*H04L 12/28* (2006.01)
*H04L 12/707* (2013.01)
*H04L 12/46* (2006.01)
*H04L 12/741* (2013.01)
*H04L 12/931* (2013.01)

(Continued)

(52) U.S. Cl.
CPC ............ *H04L 45/22* (2013.01); *H04L 12/4641* (2013.01); *H04L 45/54* (2013.01); *H04L 45/586* (2013.01); *H04L 49/70* (2013.01)

(58) Field of Classification Search
None
See application file for complete search history.

(56) References Cited

U.S. PATENT DOCUMENTS

| 5,825,772 A | 10/1998 | Dobbins et al. |
| 5,892,912 A | 4/1999 | Suzuki et al. |

(Continued)

OTHER PUBLICATIONS

Amazon Web Services, "Extend Your IT Infrastructure with Amazon Virtual Private Cloud", Jan. 2010, pp. 1-6.

(Continued)

*Primary Examiner* — Eunsook Choi
(74) *Attorney, Agent, or Firm* — Edell, Shapiro & Finnan, LLC

(57) ABSTRACT

A layer-3 virtual router connects two or more virtual networks. Virtual networks are overlaid upon physical networks. Each virtual network (VN) is a layer-2 network that appears to expand an organization's LAN using virtual MAC addresses. The network stack forms a virtual-network packet with a virtual gateway MAC address of the virtual router to reach a remote virtual network. A VN device driver shim intercepts packets and their virtual MAC and IP addresses and encapsulates them with physical packets sent over the Internet. A VN switch table is expanded to include entries for nodes on the remote virtual network so that all nodes on both virtual networks are accessible. A copy of the VN switch table is stored on each node by a virtual network management daemon on the node. A Time-To-Live field in the virtual-network packet is decremented for each virtual hop and a checksum recalculated.

25 Claims, 18 Drawing Sheets

(51) Int. Cl.
*H04L 12/713* (2013.01)
*H04L 12/56* (2006.01)

(56) References Cited

U.S. PATENT DOCUMENTS

| | | | |
|---|---|---|---|
| 6,438,612 B1 | 8/2002 | Ylonen et al. | |
| 6,493,349 B1 | 12/2002 | Casey | |
| 6,711,152 B1 | 3/2004 | Kalmanek, Jr. et al. | |
| 7,088,714 B2 | 8/2006 | Athreya et al. | |
| 7,113,498 B2 | 9/2006 | Bajic | |
| 7,154,861 B1 | 12/2006 | Merchant et al. | |
| 7,209,976 B2 | 4/2007 | Folkes et al. | |
| 7,242,665 B2 | 7/2007 | Langille et al. | |
| 7,272,643 B1 | 9/2007 | Sarkar et al. | |
| 7,296,092 B2 | 11/2007 | Nguyen | |
| 7,352,745 B2 | 4/2008 | Perera et al. | |
| 7,453,852 B2 * | 11/2008 | Buddhikot et al. | 370/331 |
| 7,478,167 B2 | 1/2009 | Ould-Brahim et al. | |
| 7,486,659 B1 | 2/2009 | Unbehagen et al. | |
| 7,606,939 B1 | 10/2009 | Finn | |
| 7,617,327 B1 | 11/2009 | Allam et al. | |
| 7,634,608 B2 | 12/2009 | Droux et al. | |
| 7,730,210 B2 | 6/2010 | Kuik et al. | |
| 7,733,795 B2 | 6/2010 | Johnson et al. | |
| 7,733,802 B2 | 6/2010 | Ho et al. | |
| 7,802,000 B1 * | 9/2010 | Huang et al. | 709/228 |
| 7,835,367 B2 | 11/2010 | Shimada | |
| 7,894,451 B2 | 2/2011 | Parker et al. | |
| 7,948,994 B2 | 5/2011 | Shen | |
| 2002/0152373 A1 | 10/2002 | Sun et al. | |
| 2003/0037165 A1 | 2/2003 | Shinomiya | |
| 2004/0085965 A1 | 5/2004 | Fotedar | |
| 2004/0243705 A1 | 12/2004 | Netravali et al. | |
| 2004/0249973 A1 * | 12/2004 | Alkhatib et al. | 709/245 |
| 2004/0249974 A1 * | 12/2004 | Alkhatib et al. | 709/245 |
| 2005/0066035 A1 | 3/2005 | Williams et al. | |
| 2005/0281249 A1 | 12/2005 | Chander et al. | |
| 2006/0045089 A1 | 3/2006 | Bacher et al. | |
| 2006/0155708 A1 | 7/2006 | Brown et al. | |
| 2006/0206300 A1 | 9/2006 | Garg et al. | |
| 2006/0233168 A1 | 10/2006 | Lewites et al. | |
| 2007/0192434 A1 * | 8/2007 | Kodama et al. | 709/218 |
| 2007/0280243 A1 * | 12/2007 | Wray et al. | 370/392 |
| 2009/0046726 A1 | 2/2009 | Cabrera et al. | |

OTHER PUBLICATIONS

OpenVPN Technologies, "OpenVPN Access Server" Datasheet, Jun. 2, 2010, pp. 1-2.

* cited by examiner

FIG. 6

VN SWITCH TABLE

| VN ID | NODE ID | VIRTUAL IP | VIRTUAL MAC | DEST. PHY IP:PORT | ENCRYPT. KEY |
|---|---|---|---|---|---|
| VN1 | NODE 1 | 10.1.1.1 | 11:22:33:44:55:66 | 207.1.2.3:8002 | 7AB30445FF |
| VN1 | NODE 2 | 10.1.1.3 | 43:79:88:00:15:82 | 72.45.1.2:8002 | C04F45DF71 |
| VN1 | NODE 3 | 10.1.1.5 | 14:79:81:00:15:55 | 72.45.1.5:8002 | FF4F45D333 |
| ... | ... | ... | ... | ... | ... |
| VN1 | NODE 9 | 10.1.1.13 | 33:79:38:00:15:89 | 192.1.1.13:8002 | C04F45DF71 |
| VN1 | NODE GW | 10.1.1.254 | 00:34:00:70:02:00 | JUMP TO VN2 TBL | 00000000000 |
| VN2 | NODE 1 | 192.168.1.1 | 33:79:38:00:15:89 | 207.1.2.3:8002 | 7AB30445FF |
| ... | ... | ... | ... | ... | ... |
| VN2 | NODE 9 | 192.168.1.9 | 63:79:38:05:15:84 | 192.6.1.13:8002 | 123445DF7B |
| VN2 | NODE GW | 192.168.1.254 | 00:50:00:80:00:11 | JUMP TO VN1 TBL | 00000000000 |

50

350

CONFIGURE VIRTUAL ROUTER:

VN1    10.1.1/24    (THIS VN)

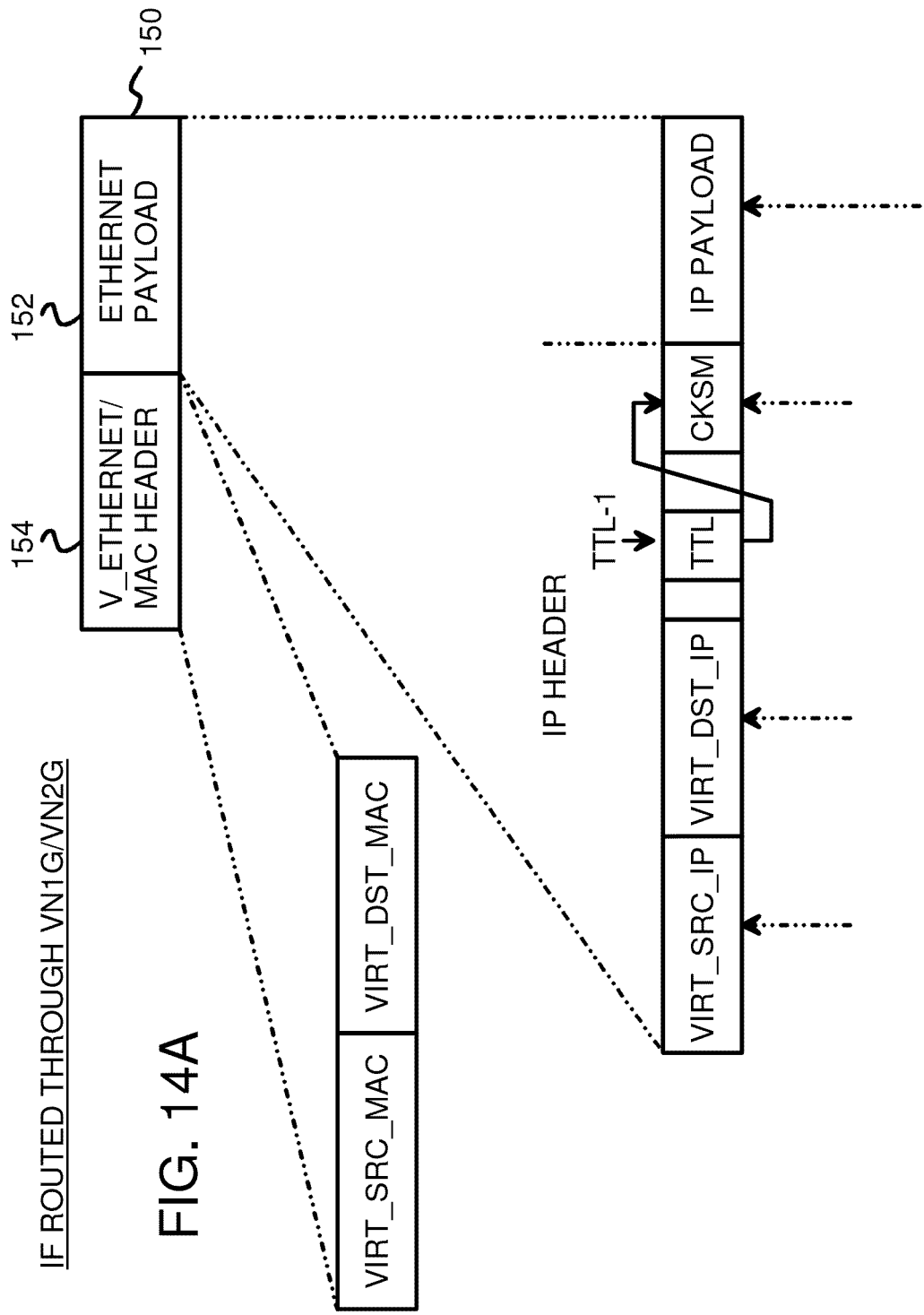

FULLY DISTRIBUTED ROUTING OVER A USER-CONFIGURED ON-DEMAND VIRTUAL NETWORK FOR INFRASTRUCTURE-AS-A-SERVICE (IAAS) ON HYBRID CLOUD NETWORKS

RELATED APPLICATIONS

This application is a continuation of U.S. application Ser. No. 13/365,245, filed Feb. 2, 2012, the entirety of which is incorporated herein by reference. This application is also related to the co-pending application for "A User-Configured On-Demand Virtual Layer-2 Network for Infrastructure-as-a-Service (IaaS) On a Hybrid Cloud Network", U.S. Ser. No. 13/117,986, filed May 27, 2011.

FIELD OF THE INVENTION

This invention relates to Internet cloud services, and more particularly to user-configurable networking for hybrid cloud-computing systems.

BACKGROUND OF THE INVENTION

There are many options for Website Hosting. Organizations may host their websites and other applications using their own servers located on the organizations' property as well as in infrastructure providers' data centers Infrastructure providers frequently choose to offer virtual servers to their customers (a subscribing organization, or simply a subscriber), instead of physical servers. A virtualization host (vHost), or hypervisor, controlled by the staff of the infrastructure provider allows subscribers to set up many virtual machine instances (VMs) on a single physical server. The number of virtual machines in use by a subscriber can vary over time as demand fluctuates.

There are a number of outsourced infrastructure service providers that offer these kinds of cloud computing services to their subscribers. Cloud computing provides convenient, on-demand access to a shared pool of configurable computing resources (networks, servers, storage, applications, and services) that can be rapidly provisioned and released with minimal management effort or service-provider interaction. Using various software tools, a subscriber can provision resources from the shared pool automatically without action by the staff of the cloud computing provider. The cloud computing resources are pooled and shared among all subscribers with resources dynamically re-assigned according to end-user demand. Resources are often located in many different remote geographical locations.

The cloud computing resources can be rapidly provisioned to meet demand surges, allowing the subscribers' resources to be scaled up and down as demand fluctuates. Such resource usage is monitored and reported so that subscribers may be billed only for actual usage.

Software as a Service (SaaS) is an application delivery model that enables organizations to subscribe to software application services running at the SaaS provider. These SaaS applications can be accessed across the Internet through web browsers or other clients. The subscriber does not control the underlying servers, storage, network, or operating systems. Some outsourced infrastructure providers such as those that offer on-demand cloud computing services have built infrastructure control applications and application program interfaces (APIs) that enable subscribers to interact with their infrastructure in a manner similar to that of SaaS applications. These kinds of outsourced infrastructure providers are often referred to as an Infrastructure as a Service (IaaS) provider. Examples of IaaS providers include Amazon, Linode, and Rackspace, and examples of their products include Amazon's Web Services Elastic Compute Cloud (EC2), Linode, and Rackspace Cloud Hosting.

Many organizations, as they begin to take advantage of IaaS offerings, may use a hybrid approach. The organization may have company-owned on-premises servers and also subscribe to one or more cloud computing IaaS providers. The organization may use a combination of physical and virtual servers, both on-premises and off-premises.

Data may need to be transferred between on-premises servers and off-premises servers. These servers could be either physical or virtual. Such hybrid clouds pose various challenges, especially for networking, since the cloud service provider still controls their underlying hardware infrastructure such as the servers and networks. The subscriber does not control the underlying hardware or networks at the cloud service provider.

FIG. 1 shows a prior-art hybrid cloud network. An organization such as a company that has a web site or application that they wish to deploy in the cloud, has company-owned servers located on company property at on-premises location 104. The on-premises servers can include some dedicated servers that are physical machines, such as physical node 12, and other dedicated servers that run a virtualization host (vHost or hypervisor) software, such as VMWare or Xen, originally developed by the University of Cambridge Computer Laboratory. The virtualization host software runs several virtual-machine nodes, VM nodes 14, which can each run applications to service client requests from Internet 100.

The organization also rents dedicated physical servers at hosted-server location 106 to run applications that service user requests from Internet 100. These servers include hosted physical nodes 13, which can be hosted by hosted server providers such as RackSpace. Other services could be provided by hosted-server location 106 such as cloud services (not shown) or co-location servers that are owned by the organization, not the provider.

The organization also subscribes to an IaaS provider which offers cloud computing resources from cloud-computing provider 108. Cloud-computing provider 108 could be EC2 or Rackspace Cloud, Linode, Slicehost, Terramark or any other similar IaaS provider. Cloud-computing provider 108 provides cloud services on-demand by running IaaS software that allows subscribers to automatically provision virtual machines instances such as VM nodes 14.

Client applications such as web browsers of remote users from Internet 100 can access the nodes that are configured as webservers, while the rest of the nodes can communicate with each other to process application data or serve database requests as needed. For example, a webserver application running on VM node 14 on cloud-computing provider 108 may need to communicate with a database application running on VM node 14 at on-premises location 104. Another webserver application running on hosted physical node 13 at hosted-server location 106 may also need to communicate with a database application running on physical node 12 at on-premises location 104.

IP Packets are sent over Internet 100 using Internet Protocol (IP) addresses and layer-3 routing of IP packets. Routers 22 transfer packets to and from local networks at on-premises location 104, hosted-server location 106, and cloud-computing provider 108. These local networks are usually layer-2 Ethernet networks that use Media-Access-Controller (MAC) addresses, sometimes referred to as Ethernet addresses. For example, layer-2 physical network 20 is a Local-Area-Network (LAN) that connects network interface controllers (NIC) 18 and router 22. The virtualization host may provision virtual NIC VNIC 16 for each virtual machine VM node 14, and connect each VNIC 16 to a physical NIC 18 for the virtual servers.

Cloud-computing provider 108 may have internal network 102 that uses router 22 to connect its own systems and possibly other datacenters to Internet 100. Internal network 102 could be a combination of wide area network (WAN) links connecting geographically distributed datacenters as well as LANs. Internal network 102 also includes the physical NICs on the IaaS host (not shown) that are necessary to connect VNIC 16 for instances of VM nodes 14 running on the IaaS host to an internal LAN connected to router 22 and provide access to Internet 100. Internal network 102 could be part of the IaaS provider's own network or even part of a different network provider's network for wide area connectivity such as Level 3 or AT&T.

The implementation details of internal network 102 are unknown to subscribers and therefore could use any combination of layer 3 routing and layer 2 switching technologies. Subscribers to cloud service provider 108 have no control over internal network 102 and therefore cannot change the configuration in any way.

Sometimes data needs to be transferred among servers at different locations. For example, an organization may keep its customer database secure at on-premises location 104 and only allow queries into the database from applications running on external servers such as at hosted-server location 106 or cloud-computing provider 108. Data may need to be transferred from physical node 12 to hosted physical node 13. A dedicated trunk connection may not be cost effective or practical between on-premises location 104 and hosted-server location 106, so a virtual-private-network (VPN) can be established through Internet 100.

VPN tunnel 24 connects physical node 12 to hosted physical node 13 by establishing a tunnel through Internet 100. Application software running on physical node 12 sends a message to hosted physical node 13 using a virtual IP address for hosted physical node 13. VPN software encrypts and packages the message and translates the virtual IP address to a physical IP address of NIC 18 on hosted physical node 13. VPN software on hosted physical node 13 translates the physical IP addresses to virtual IP addresses and decrypts the message. VPN tunnel 24 can also send messages in the reverse direction by a similar process.

While effective, VPN tunnel 24 only connects two nodes in a point-to-point manner. Separate VPN tunnels need to be set up for each pair of nodes. Thus a large number of VPN tunnels 24, 25 may need to be configured, one for each pair of nodes. This configuration may be manual and time-consuming.

As additional instances of VM nodes 14 on cloud-computing provider 108 are created, additional VPN tunnels 25 may need to be set up manually if applications running on VM nodes 14 need to query databases on physical node 12 at on-premises location 104, as well as to every other node with which it needs to communicate. Each VPN tunnel 25 connects a VNIC 16 for one of VM nodes 14 to NIC 18 of physical node 12.

The administrative burden of creating these VPN tunnels causes some organizations to introduce a dedicated VPN gateway device whereby each node connects only to the gateway device, thereby simplifying VPN creation. However, this gateway device introduces additional latency as well as a potential performance bottleneck since the gateway needs to process all packets from all nodes. The hub and spoke topology required for these kinds of VPN tunnels precludes the use of specific network topologies that may be required for certain multi-tiered application deployment.

Even without a gateway device, fully meshed VPNs can sometimes impact performance. VPN software is often simply a user-level application, which needs to translate individual network packets and encrypt data, which can easily slow a system down.

Virtual Layer-2 Networking in Parent Application

Rather than use layer-3 IP routing through VPN tunnels 24, 25, the parent application discloses that additional VM nodes 14 on cloud-computing provider 108 and at hosted server location 106 appear to be on a virtualized layer-2 network at on-premises location 104. Switching over layer-2 physical network 20 is performed by MAC (or Ethernet) addresses at layer-2, rather than IP addresses at layer-3.

Connections to VM nodes 14 on cloud-computing provider 108 and at hosted server location 106 are virtualized and appear on a virtualized layer-2 network that includes layer-2 physical network 20 at on-premises location 104. This is better than networking using only VPN tunnels, which are hard to maintain, restrict network topologies, and often introduce performance bottlenecks.

FIG. 2 shows a hybrid cloud network with overlaid user-configurable virtual layer-2 networks. Virtual networks VN1, VN2, and VN3 are overlaid on top of the physical layer-3 (IP) and layer-2 LAN (Ethernet) networks that physically connect on-premises location 104, hosted-server location 106, and cloud-computing provider 108. Virtual networks VN1, VN2, and VN3 are isolated from each other, yet use the same underlying physical networks.

Virtual networks VN1, VN2, and VN3 are layer-2 networks, using virtual Ethernet addresses to identify nodes on the virtual network. Since virtual networks VN1, VN2, and VN3 are isolated from each other, they each can use their own independent IP and Ethernet addresses ranges. This means that the same virtual IP and Ethernet addresses can exist on two different VNs without conflict, since the virtual IP and MAC addresses are specific only to one virtual network.

Virtual network VN1 connects physical node 12 and VM nodes 14 on on-premises location 104 to VM nodes 14 on cloud-computing provider 108. An organization could use this virtual network VN1 to run applications that can access an internal database on physical node 12, such as for remote employees and other trusted end-users.

Virtual network VN2 connects hosted physical nodes 13 on hosted-server location 106 to VM nodes 14 on cloud-computing provider 108. VN2 does not allow remote applications on VN2 to access physical node 12 on on-premises location 104. An organization could use this second virtual network VN2 to run applications that cannot access an internal database on physical node 12, such as for the general public accessing a company web site, or other un-trusted end-users.

Virtual network VN3 connects hosted physical nodes 13 at hosted-server location 106 and VM nodes 14 on on-premises location 104 but not VM nodes 14 on cloud-computing provider 108. An organization could use this third virtual network VN3 to run applications that can access another, less secure internal database on VM nodes 14, such as for the general public querying a database of products and prices that is kept on VM nodes 14 on on-premises location 104.

Each of virtual networks VN1, VN2, and VN3 has a different group of virtual Ethernet addresses within that network's broadcast domain. The same virtual Ethernet (or virtual IP) address could exist on two virtual networks, such as by being part of broadcast domain B1 of VN1 and broadcast domain B2 of VN2. Virtual networking software isolates each virtual network from other virtual networks.

Other organizations (not shown) could have other virtual networks that also use servers at hosted-server location 106 and cloud-computing provider 108, along with company servers at their own, different on-premises location (not shown). These virtual networks are kept isolated and independent of other virtual networks by virtual networking control software.

Special virtual-network configuration software is used to manage and control each VN. Providers of this configuration software can make it available to subscribers offering it as a compliment to their existing on-premises networks, rented physical servers, and cloud computing provider subscriptions. This virtual-network configuration and management service is itself an Infrastructure as a Service offering. Unlike Amazon's EC2 IaaS offering, this virtual network IaaS need not provide compute or storage resources, only network infrastructure configuration and management services on demand.

Organizations can subscribe to this virtual network offering, and configure and manage their own virtual networks using special virtual-network configuration software. A subscriber organization can add or remove nodes on a virtual network without help by the staff at cloud-computing provider 108 or hosted-server location 106. Thus the subscribers have control over their own virtual networks. The virtual layer-2 networks become another resource that is user-configurable and metered that can be provided by an independent Virtual Network Infrastructure as a Service (VN IaaS) provider or as a virtual network subscription offering made available by cloud-computing provider 108.

IT staff at on-premises location 104 now has control over the virtual network that connects all of their systems, without requiring control over the network that the external systems are physically attached to.

When one of the instances of VM nodes 14 moves from one physical server (virtualization host) to another at cloud-computing provider 108, such as when node migration occurs due to guest migration, the virtual-network configuration and network policies may move with the instance or guest as its is moved.

Isolation of Multiple Virtual Networks—FIG. 3

FIG. 3 shows multiple virtual networks that are isolated form one another. A large organization has two separate virtual networks 320, 322. Virtual network 320 (VN1) has virtual MAC addresses that are in broadcast domain B1, and connects to physical node 302 and VM nodes 304, 306 at on-premises location 104 and to VM nodes 308, 310 at cloud-computing provider 108.

A second virtual network 322 (VN2) has virtual MAC addresses that are in broadcast domain B2, and connects to physical nodes 312, 314 and to VM nodes 316, 318 at cloud-computing provider 108.

Virtual networks VN1, VN2 behave as though their nodes were connected using a familiar physical layer-2 switch. However, in reality, they are connected via a distributed virtual layer-2 switch that forwards Ethernet frames to the correct destination using the underlying physical network, such as router 22 and Internet 100.

Virtual-network-configuration clients 54 allow VN IaaS subscribers to configure each of virtual networks VN1, VN2 independently from each other as well as from the internet and the physical network provided by cloud-computing provider 108 to their subscribers.

While such virtual layer-2 networks are useful, sometimes data may need to be sent from virtual network VN1 to second virtual network VN2. Since virtual networks 320, 322 are isolated from each other, and virtual, they are not visible to one another. While a single larger layer-2 virtual network could be used that connects to all nodes, there may be reasons for a single organization to have two or more separate layer-2 virtual networks. For example, one virtual network VN1 may be used for external sales support, while another virtual network VN2 is used for back-end office functions such as accounting.

It would be desirable to maintain two or more layer-2 virtual networks that are separate from each other, but still provide a virtual mechanism to pass data from one virtual network to another virtual network. The parent application provided virtual layer-2 networks. It is desirable to provide layer-3 virtual routing to connect two or more layer-2 virtual networks. A virtual router for use with virtual networks is desirable.

Virtual layer-2 and virtual layer-3 networking software for use by a cloud computing subscriber is desired to extend Infrastructure as a Service (IaaS) to multiple virtual layer-2 networks. This allows a subscriber to configure their own layer-2 networks, and connect them together with a virtual layer-3 router. An IaaS userconfigurable virtual network is desirable for virtual layer-3 routing.

BRIEF DESCRIPTION OF THE DRAWINGS

FIG. 6 shows entries in a VN switch table that connects to a virtual router.

FIG. 13 shows a user interface for configuring a virtual router.

FIGS. 14A-C highlight encapsulation of a virtual-network packet with a physical packet when the virtual-network packet is passed through a virtual router.

DETAILED DESCRIPTION

The present invention relates to an improvement in Infrastructure as a Service (IaaS) virtual networking. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 4:
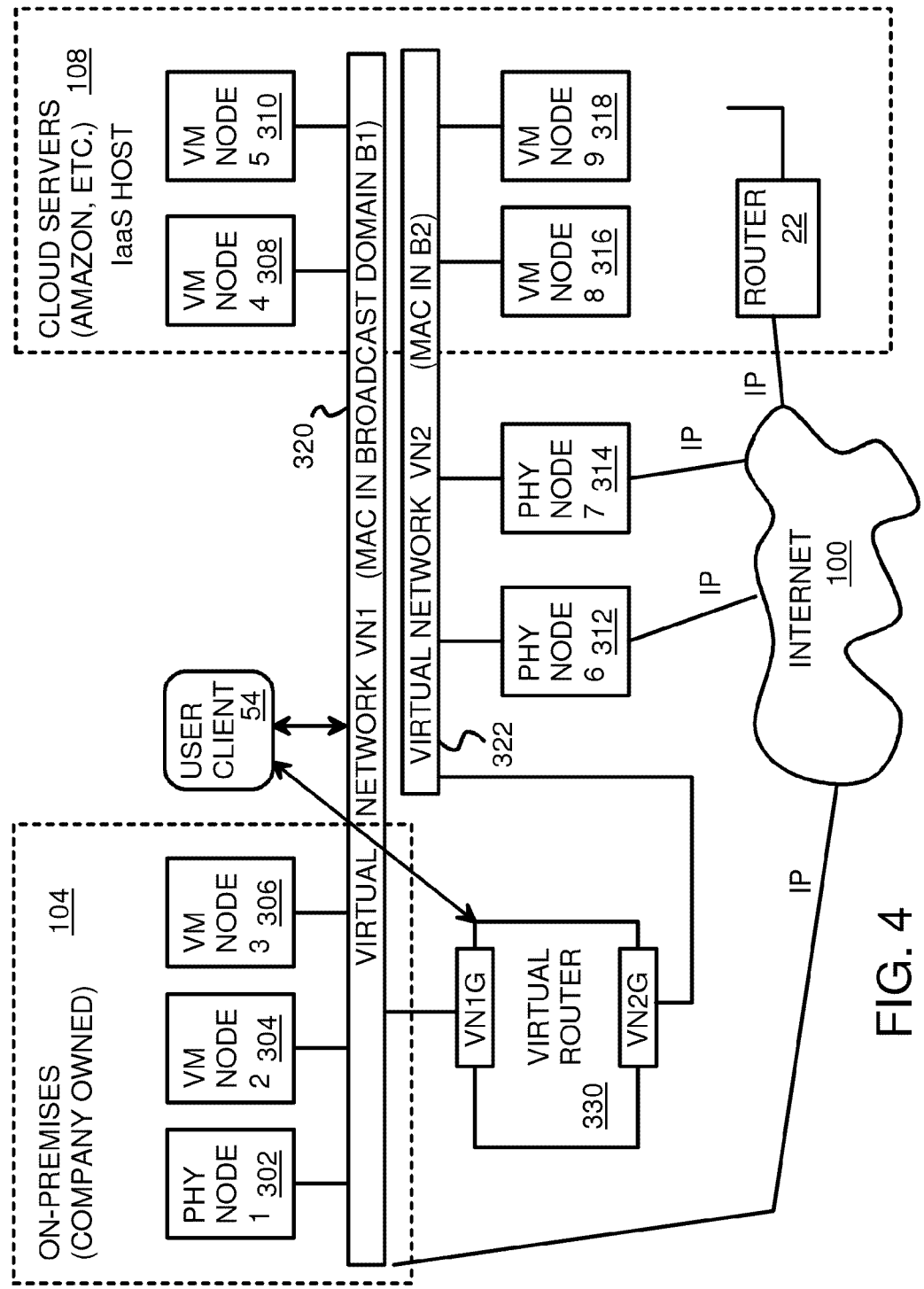
FIG. 4 shows a virtual layer-3 router that connects multiple layer-2 virtual networks.

Virtual Router Connects Multiple Virtual Networks—FIG. 4

FIG. 4 shows a virtual layer-3 router that connects multiple layer-2 virtual networks. A large organization has two separate virtual networks 320, 322. Virtual network 320 (VN1) has virtual MAC addresses that are in broadcast domain B1, and connects to physical node 302 and VM nodes 304, 306 at on-premises location 104 and to VM nodes 308, 310 at cloud-computing provider 108. A second virtual network 322 (VN2) has virtual MAC addresses that are in broadcast domain B2, and connects to physical nodes 312, 314 and to VM nodes 316, 318 at cloud-computing provider 108.

Virtual router 330 is a layer-3 router that performs virtualized layer-3 routing between virtual networks 320, 322, which are separate layer-2 broadcast domains B1, B2. Virtual router 330 has a first interface VN1G to first virtual network VN1, and a second interface VN2G to second virtual network VN2. Each interface has its own virtual IP address and its own virtual MAC address on the respective virtual networks.

Virtual router 330 acts as an endpoint for layer-2 virtual-network packets. Virtual router 330 maintains separation of the two broadcast domains B1, B2. MAC frames cannot pass through virtual router 330 from virtual network VN1 to virtual network VN2.

Virtual IP packets may be routed from VN1 to VN2 through virtual router 330. Virtual router 330 acts as a gateway to the other virtual network. For example, physical node 302 on VN1 can forward a virtual-network packet to first interface VN1G on virtual router 330 by using the virtual MAC address of virtual router 330 as the destination of the first hop. Then virtual router 330 strips off the virtual MAC address and moves the virtual IP packet from first interface VN1G to second interface VN2G, where the virtual-network packet is encapsulated by a MAC address for the destination node on VN2, such as for VM node 318.

Virtual networks VN1 and VN2 are layer-2 virtual networks that allow any node on the virtual network to communicate with any other node on the virtual network. Virtual networks VN1, VN2 each behave as though they were connected using a familiar physical layer-2 switch. However, in reality, they are connected via a distributed virtual layer-2 switch that forwards Ethernet frames to the correct destination using the underlying physical network, such as router 22 and Internet 100.

Virtual-network-configuration client 54 is a software client run by IT staff of a subscriber of Virtual Network IaaS provider or cloud-computing provider 108. Virtual-network-configuration client 54 allows a VN IaaS subscriber to configure each of virtual networks VN1, VN2 independently from each other as well as from the internet and the physical network provided by cloud-computing provider 108 to their subscribers.

Virtual-network-configuration client 54 also allows a subscriber to configure virtual router 330 to connect two or more virtual networks 320, 322 together using virtual layer-3 routing. Virtual-network-configuration client 54 can be activated to add a new node to the virtual network, or to connect two virtual networks together using a virtual router. A virtual Ethernet MAC address and a virtual IP address are assigned to each interface of virtual router 330.

The actual switching and routing of the data in the virtual-network packets is performed by the physical networks. A switch table is downloaded to each virtual node. This switch table contains routing information for the physical networks to route data to other nodes on the virtual network.

The physical routes from one node to all the other nodes in the local virtual network, and in the remote virtual network connected through virtual router 330, are determined by including the physical IP address of the physical server that runs the node in the switch table. This switch table is downloaded to each node in the virtual network. With this physical IP address, each node relies upon the built-in routing capabilities of the physical network infrastructure to determine a route to the node.

Virtual router 330 is not a real physical router. Instead, when virtual router 330 is activated between two virtual networks, the switch tables for nodes on the virtual network are expanded to allow for routing data to the other virtual network. The behavior of a physical router is mimicked by virtual router 330, such as by decrementing the timeto-live (TTL) count and updating checksums when packets pass through virtual router 330. Thus it appears that the packet passed through a router.

Figure 5:
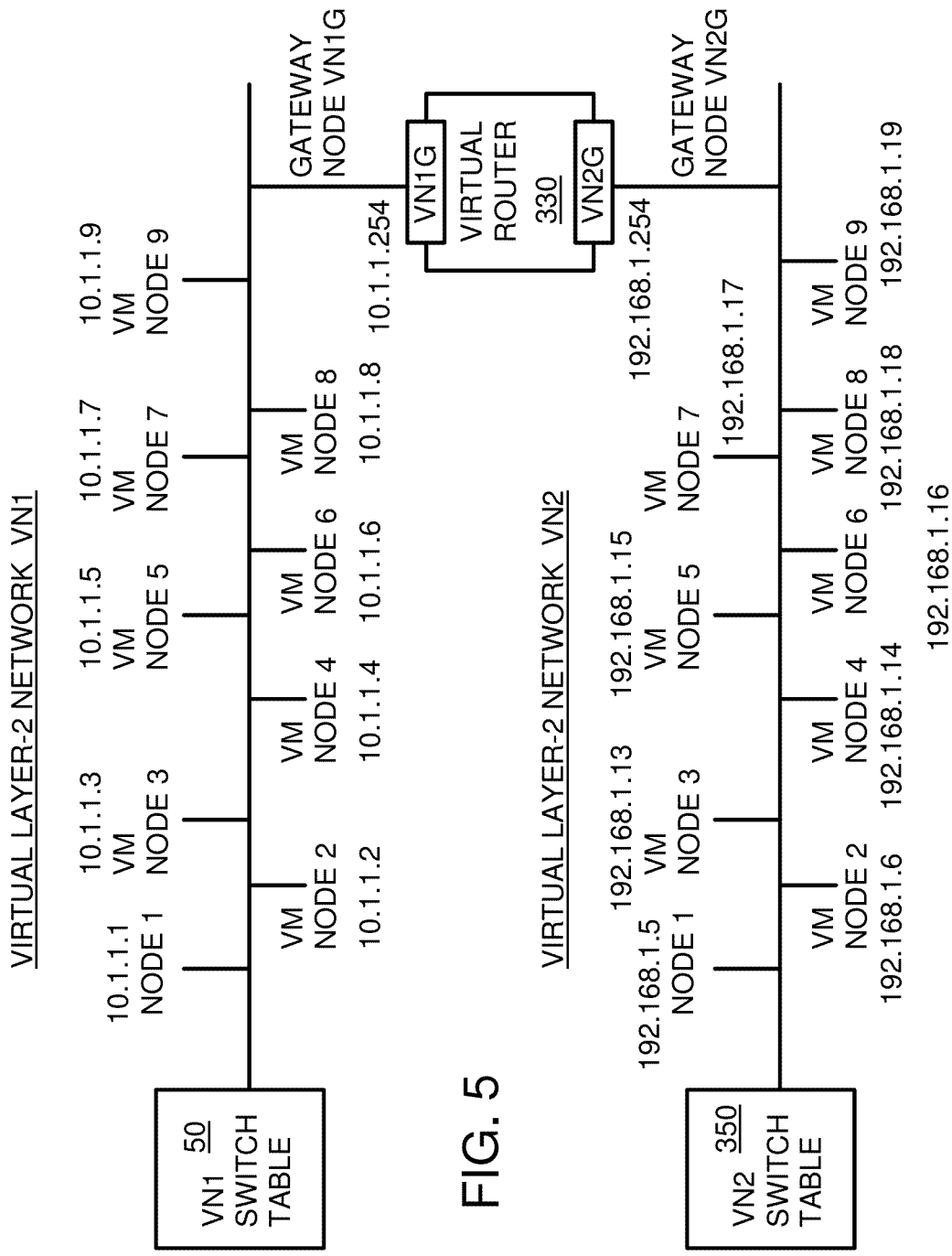
FIG. 5 shows nodes on two virtual networks that are connected by a virtual router.

FIG. 5 shows nodes on two virtual networks that are connected by a virtual router. VN switch table 50 contains entries for virtual network VN1. Virtual network VN1 contains 9 nodes, with virtual IP addresses 10.1.1.1, 10.1.1.2, . . . 10.1.1.9. Virtual network VN1 also has one gateway node VN1G, with virtual IP addresses 10.1.1.254. This gateway node is an interface or port to virtual router 330. Each node also has a virtual MAC address.

A second virtual network VN2 has its entries stored in VN switch table 350. Virtual network VN2 also contains 9 nodes, with virtual IP addresses 192.168.1.5, 192.168.1.6, 192.168.1.13, 192.168.1.14, . . . 192.168.1.19. Virtual network VN2 also has one gateway node, VN2G, with virtual IP addresses 192.168.1.254. This gateway node is an interface or port to virtual router 330.

Packets from virtual network VN1 may be sent directly to a node on second virtual network VN2 by first switching the packet to gateway VN1G, using the IP and MAC addresses for that gateway node VN1G. Gateway node VN1G is a port on virtual router 330, which routes the packet to the other router port, which is gateway node VN2G on second virtual network VN2. The packet is then switched over VN2 to the final destination node.

When virtual router 330 is present, switch table 50 is expanded to contain an entry for the gateway node VN1G, and a copy of switch table 350 for the remote virtual network VN2. When a packet is to be sent from VN1 to VN2, the copy of switching table 350 is consulted to find the physical address of the final node on second virtual network VN2. Then the packet is sent over the physical networks directly to that final node.

Unlike a packet routed on a physical network, a packet on this virtual network is forwarded directly to the destination node without any intermediate processing by the virtual router. The virtual router is, in essence, the concatenation of two virtual networks' switching tables whereby virtual routing takes place simply by knowing that when the destination MAC address is for the VN gateway, the virtual destination IP address of the of packet should be used to determine how to forward the packet.

FIG. 6 shows entries in a VN switch table that connects to a virtual router. A copy of VN switch table 50 is sent to each node on the virtual network. VN_ID field identifies each entry in VN switch table 50 as belonging to VN1 or to VN2, where VN1 and VN2 are connected together by virtual router 330. Entries for VN1 can be considered to be part of switch table 50, while entries for VN2 could be considered to be part of switch table 350, although both VN1 and VN2 entries could be part of the same physical table.

A node_ID field identifies the destination node on the virtual network. Each entry (row) shows the forwarding information for a different destination node on a virtual network. The virtual IP addresses are those used by applications running on the source node. These virtual IP and MAC addresses are used in IP packets and Ethernet frames which are encapsulated in new packets and frames with the physical IP addresses from the matching entry in VN switch table 50.

The physical MAC address is determined by existing physical network mechanisms, just as it is for every other packet that uses the physical network. An encryption key may also be stored with the entry in VN switch table 50. The encryption key can be used to encrypt the payload before transmission over the Internet, or for using a VPN for routing.

For example, when a source node runs an application program that sends a packet to node 3 on VN1, the destination's virtual IP address is 10.1.1.3 and the virtual MAC address is 14:79:81:00:15:55. The virtual IP address and the virtual MAC address are generated by VN configuration controller 42 and have previously been inserted into VN switch table 50.

The virtual MAC address of the destination node is looked up in VN switch table 50 and a match is found in the third entry. An encapsulating packet is formed with the physical IP address of 72.45.1.5 and a User Datagram Protocol UDP port of 8002 (or the virtual IP address is replaced with the physical IP address of 72.45.1.5). This packet can then be routed over the local LAN to the Internet and on to the physical destination.

If Ethernet frames are modified, instead of encapsulated, virtual IP are replaced with the physical IP address of 72.45.1.5.

Virtual Routing Example—FIG. 6

The application running on VN1 may also send a packet to a node on VN2. The application identifies the destination's virtual IP address as 192.168.1.9. The network stack looks up the virtual IP address and finds that this address is not on the local virtual network VN1, so the virtual gateway entry in switch table 50 is used. The packet is initially routed to the virtual gateway by the network stack, using the gateway's virtual IP address of 10.1.1.254 and the gateway's virtual MAC address of 00:34:00:70:02:00. A standard networking stack can perform these functions.

Figure 8:
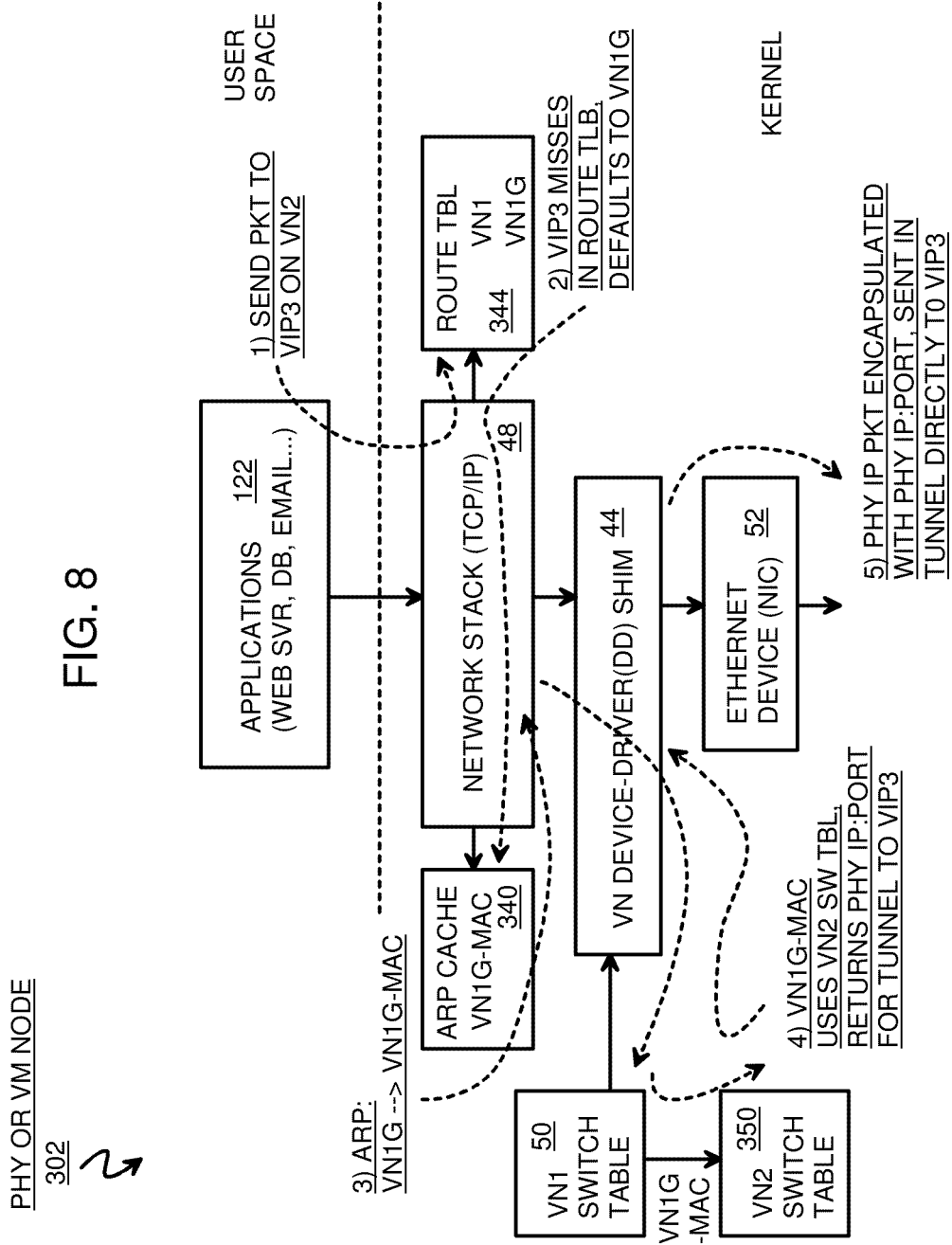
FIG. 8 highlights virtual routing performed by the network stack and VN device driver shim using switch tables for local and remote virtual networks.

The packet to the virtual gateway from the network stack is intercepted by VN device driver shim 44 (FIG. 8). VN device driver shim 44 identifies the packet for virtual routing because the packet was sent to the MAC address (of 00:34:00:70:02:00) of the VNI_GW interface of the virtual router. VN device driver shim 44 looks up the destination's virtual IP address in switch table 350 and finds a match with the entry for node 9 on VN2. An encapsulating packet is formed with the physical IP address of 192.6.1.13 and a User Datagram Protocol UDP port of 8002. This packet can then be physically routed over the local LAN to the Internet and on to the physical destination.

Figure 1:
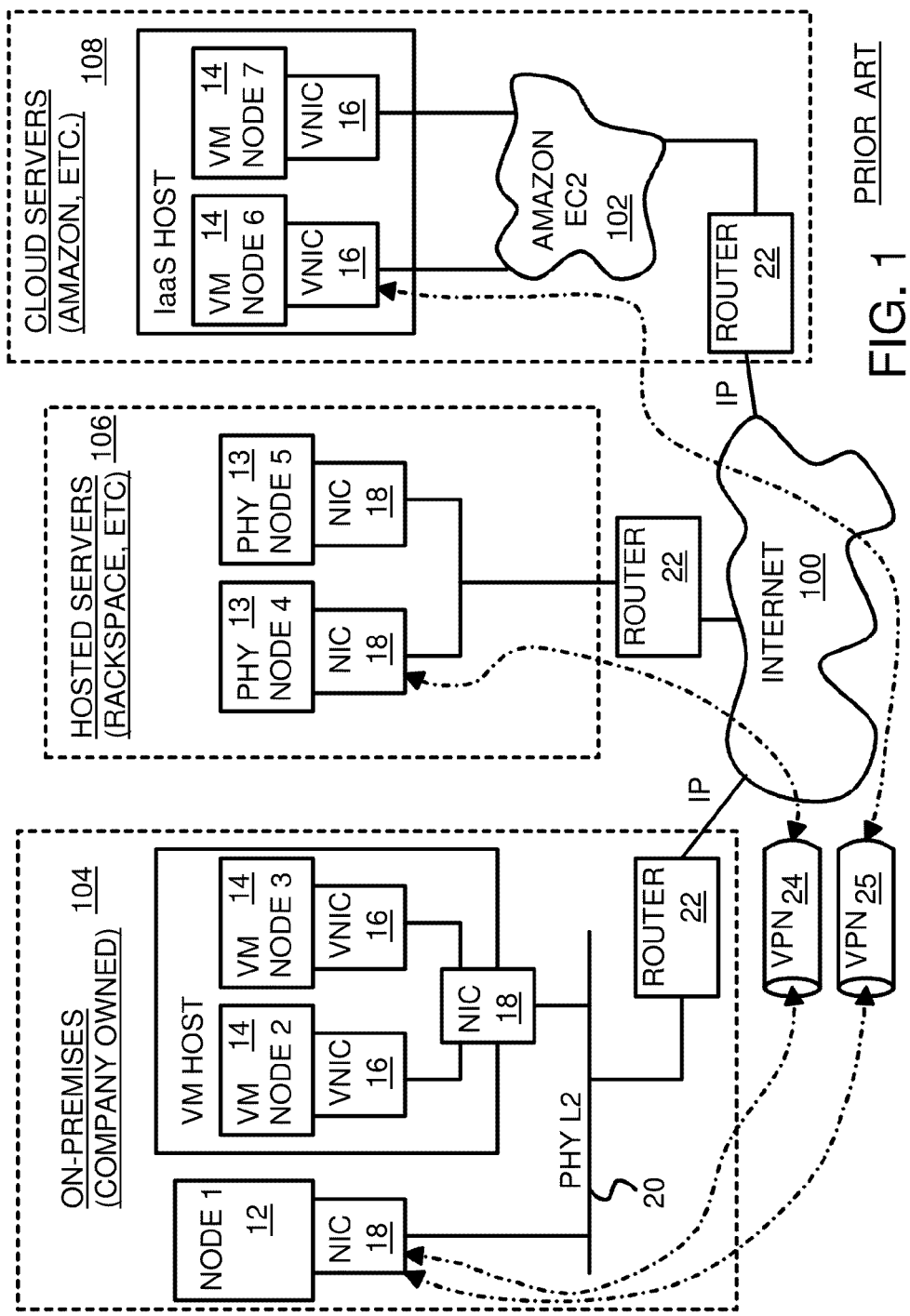
FIG. 1 shows a prior-art hybrid cloud network.
Figure 2:
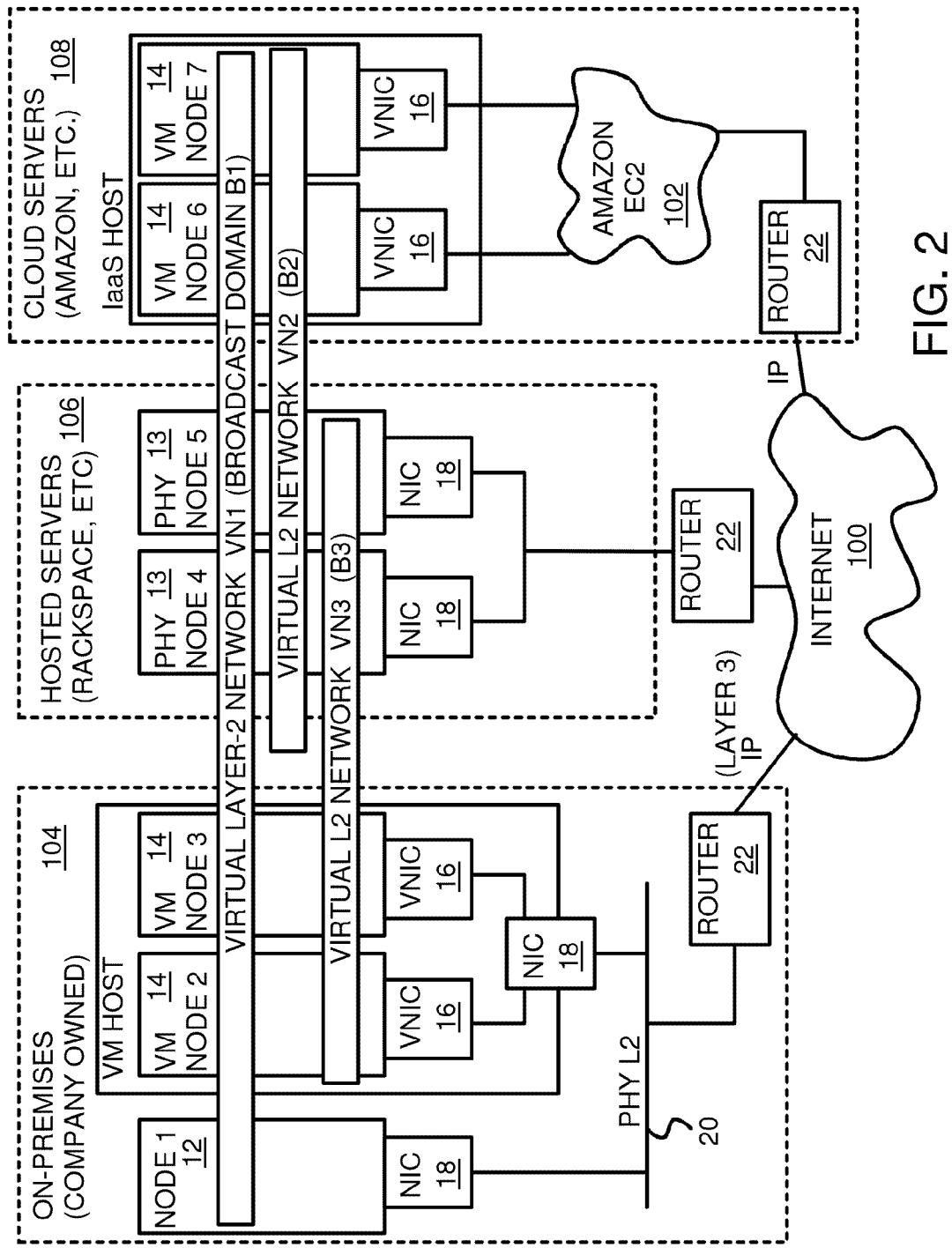
FIG. 2 shows a hybrid cloud network with overlaid user-configurable virtual layer-2 networks.
Figure 3:
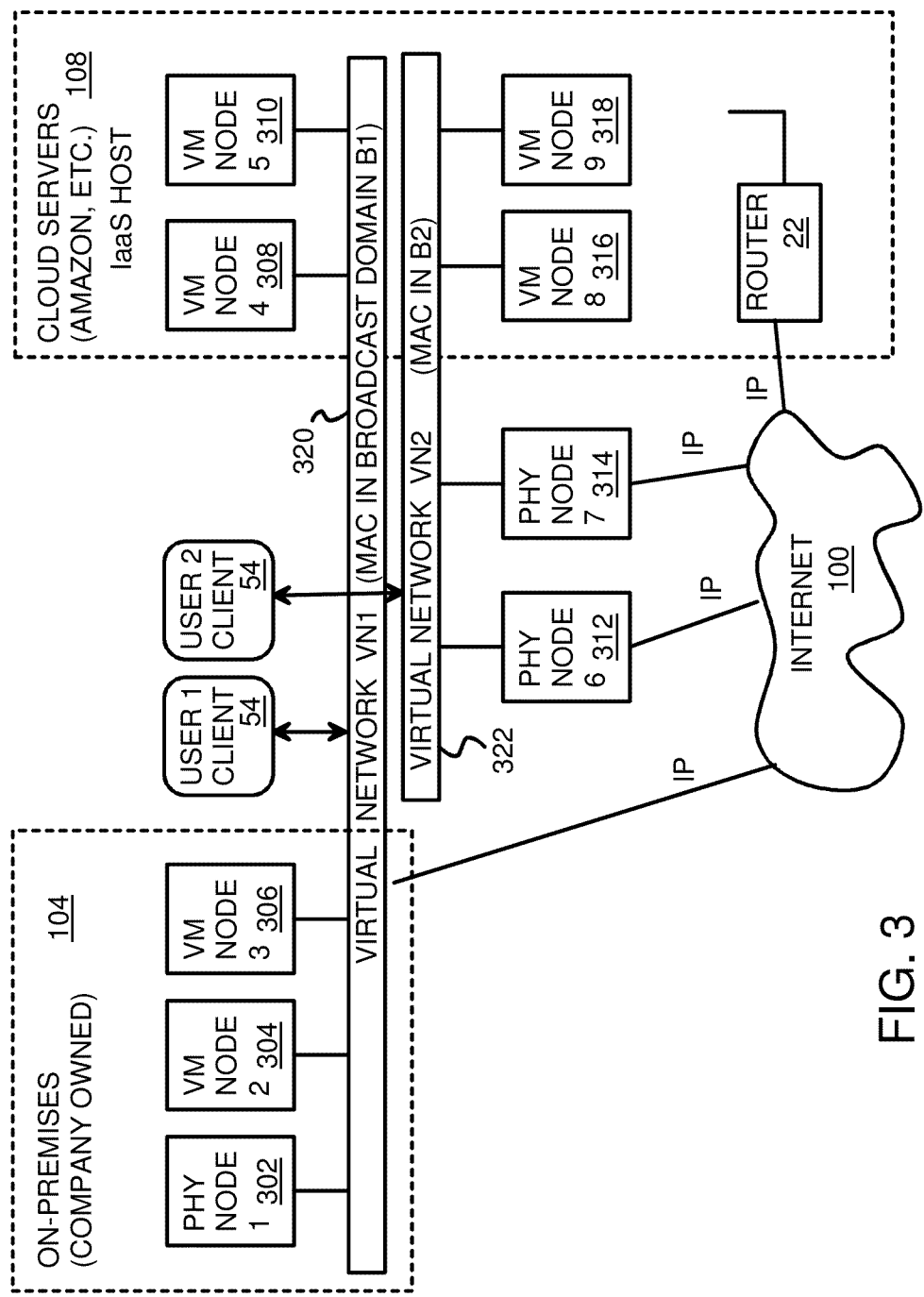
FIG. 3 shows multiple virtual networks that are isolated form one another.
Figure 7:
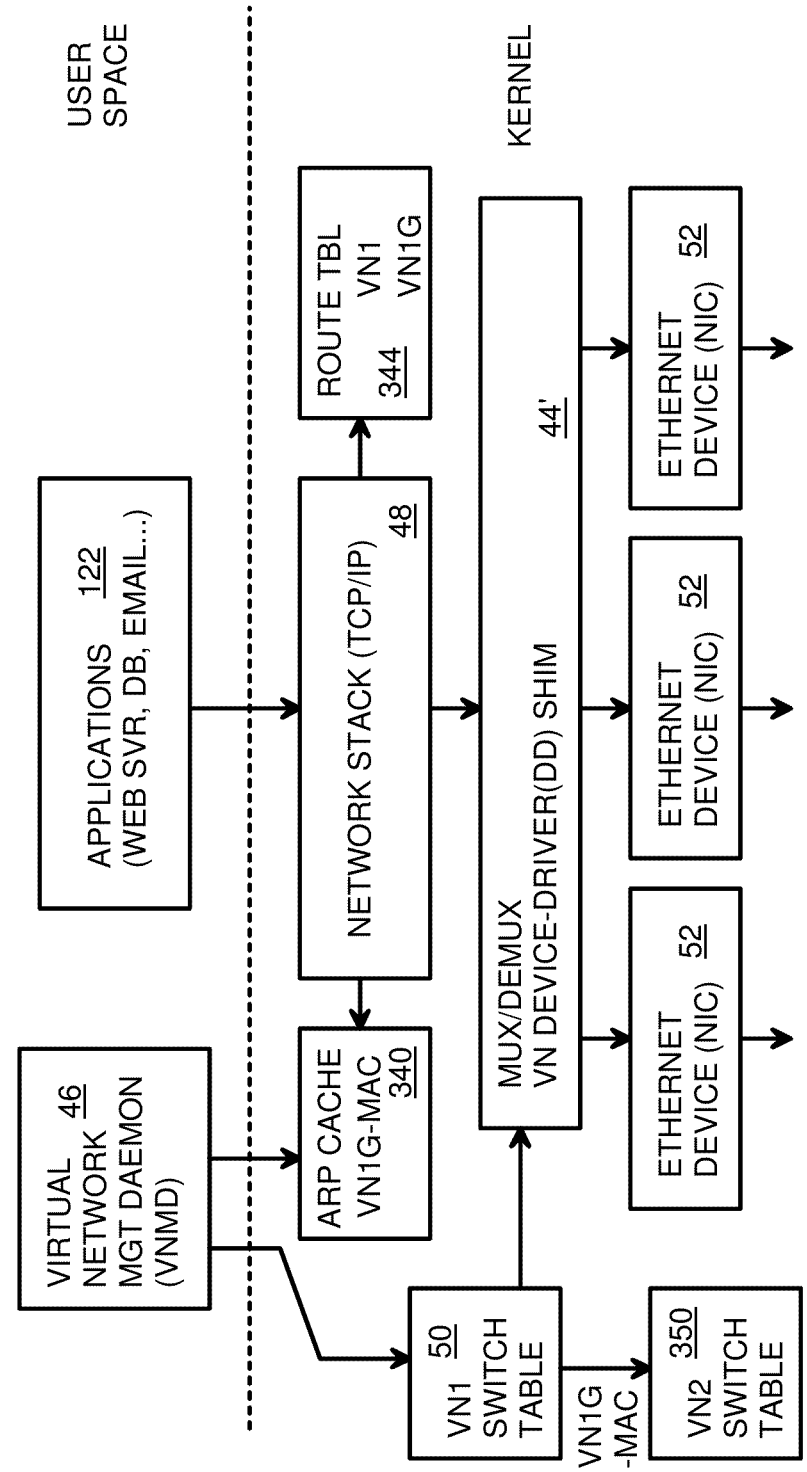
FIG. 7 shows virtual-networking daemons and shims added to each node on the virtual network.

FIG. 7 shows virtual-networking daemons and shims added to each node on the virtual network. Node 302 can be any node on the virtual network, such as physical node 12, hosted physical nodes 13, or VM nodes 14. Node 302 can be located at on-premises location 104, hosted-server location 106, or cloud-computing provider 108 (FIG. 2). FIGS. 7-8 show only the network interface portion of the nodes, while the processor, storage, internal buses, and other components of a node are not shown.

Node 302 has a user process space (user space) that executes applications 122 that can include web server, databases, email, and other applications run by end-users. Applications send and receive data through network stack 48, which is the Transport-Control-Protocol/Internet Protocol (TCP/IP) network stack.

The layer-3 IP packets are prepended with layer-2 MAC headers to create Ethernet frames within network stack 48, which outputs them to one of Ethernet Network Interface Controller (NIC) devices 52.

The creation of Ethernet frames may take place directly within network stack 48, or it may provide sufficient information about the network (such as the MAC address) to the device driver contained in Ethernet Network Interface Controller devices 52 so that it can construct Ethernet frames for deliver onto the network.

VN configuration controller 42 (FIG. 12) communicates with virtual network management daemon 46, which executes in the user space of node 302. When a new node is added to the virtual network and VN configuration database 40 is updated, VN configuration controller 42 sends the updated switch table to virtual network management daemon 46, which stores the updated table as VN switch table 50. VN switch table 50 has the address information for all nodes in the virtual network.

When a virtual router is added, switch tables 350 for other virtual networks that are connected through the virtual router are also sent by VN configuration controller 42 to virtual network management daemon 46, which stores the additional tables as VN switch table 350.

Muxing VN device driver shim 44' is inserted between network stack 48 and Ethernet NIC devices 52. Muxing VN device driver shim 44' intercepts Ethernet frames being sent by network stack 48 and looks up the virtual MAC addresses of the destination node in VN switch table 50. The physical IP address and port of the virtual destination node is read from VN switch table 50. The Ethernet frame is then encapsulated in a new IP packet with the destination IP set to be the physical IP address of the destination node that was read from VN switch table 50. The new IP packet is encapsulated with an Ethernet frame and then sent from muxing VN device driver shim 44' to NIC device 52 for transmission over the physical network.

When one node sends data to another node, it uses the other node's virtual IP address as the destination IP address. Network stack 48 on the sending node then finds the virtual MAC address for this virtual IP address. Muxing VN device driver shim 44' then encapsulates the Ethernet frame in a routable IP packet, which is then used to create a new Ethernet frame for transmission.

The Ethernet frame is sent through the physical network, which can include both Ethernet switches and IP routers using the physical MAC and IP addresses to reach the physical destination node.

Once the data packet reaches the destination node, muxing VN device driver shim 44' examines the protocol and port and removes the Ethernet and IP headers to reveal the packet payload. This payload is the original virtual Ethernet frame that contains virtual MAC and IP addresses for the destination VN nodes. Then the virtual Ethernet frame is sent up to network stack 48 and to the applications on the destination node.

Alternately, this communication can be done not by encapsulation of virtual Ethernet frames in physical IP packets, but rather by replacing the virtual MAC and IP addresses in the Ethernet header and payload with physical addresses. This alternative, however, would be restricted to use with only IP packets.

Node 302 may have multiple NIC devices 52. A different VN device driver shim 44 may placed before each NIC device 52, or muxing VN device driver shim 44' may be used. Network stack 48, VN device driver shim 44, and VN switch table 50 are located in the kernel space.

Network stack 48 uses routing table 344 to find routes to the destination. The virtual IP address of the destination is looked up in routing table 344. Routing table 344 may cache prior routes, or various standard address lookup mechanisms may be used to resolve the address and its route.

Network stack 48 searches for a MAC address that corresponds to an IP address of the next hop using ARP cache 340. ARP cache 340 is an Address Resolution Protocol mechanism that finds MAC addresses for an IP address input. An entry for the gateway virtual IP address VN1G has previously been inserted into ARP cache 340 by virtual network management daemon 46. Thus ARP cache 340 returns the virtual MAC address for gateway VN1G to network stack 48 when the virtual router is used as a gateway.

Muxing VN device driver shim 44' intercepts virtual-network packets and looks up the destination MAC address in VN1 switch table 50 for local addresses. If the destination MAC address matches the address of the virtual router gateway, the configuration of the virtual router is looked up to locate the correct switch table to access, either of the final remote network or of a virtual hop toward that remote network. Once all virtual hops have been accounted for, the destination IP address is looked up in VN2 switch table 350 to find the remote address on the far side of the virtual router. A gateway entry in VN1 switch table 50 may be used as a pointer to VN2 switch table 350 during lookup.

FIG. 8 highlights virtual routing performed by the network stack and VN device driver shim using switch tables for local and remote virtual networks. When a program in applications 122 executing in the user space sends data to a remote node on a different virtual network VN2, the data and the virtual IP address for the remote node, VIP3, is sent down to network stack 48 in the kernel space. Network stack 48 forms TCP/IP packets using the virtual IP address VIP3.

When the virtual IP address is not on the local virtual network, the network stack discovers that the destination address is not in the local network. The network stack consults routing table 344. Routing table 344 returns the IP address of the virtual gateway node, VN1G. The MAC address for that virtual gateway address is looked up. This MAC address is then used for sending out the Ethernet frame. This step may happen before or after the TCP packets (with their IP headers) are formed. TCP packets are not altered. Only the destination MAC address is altered for hop-to-hop forwarding.

Network stack 48 searches for the MAC address that corresponds to this gateway IP address using ARP cache 340. ARP cache 340 is an Address Resolution Protocol mechanism that finds MAC addresses for an IP address input. An entry for the gateway virtual IP address VN1G has previously been inserted into ARP cache 340 by virtual network management daemon 46, such as when VN2 switch table 350 was loaded, or in response to an ARP request. Thus ARP cache 340 returns the virtual MAC address for gateway VN1G to network stack 48.

Figure 14B:
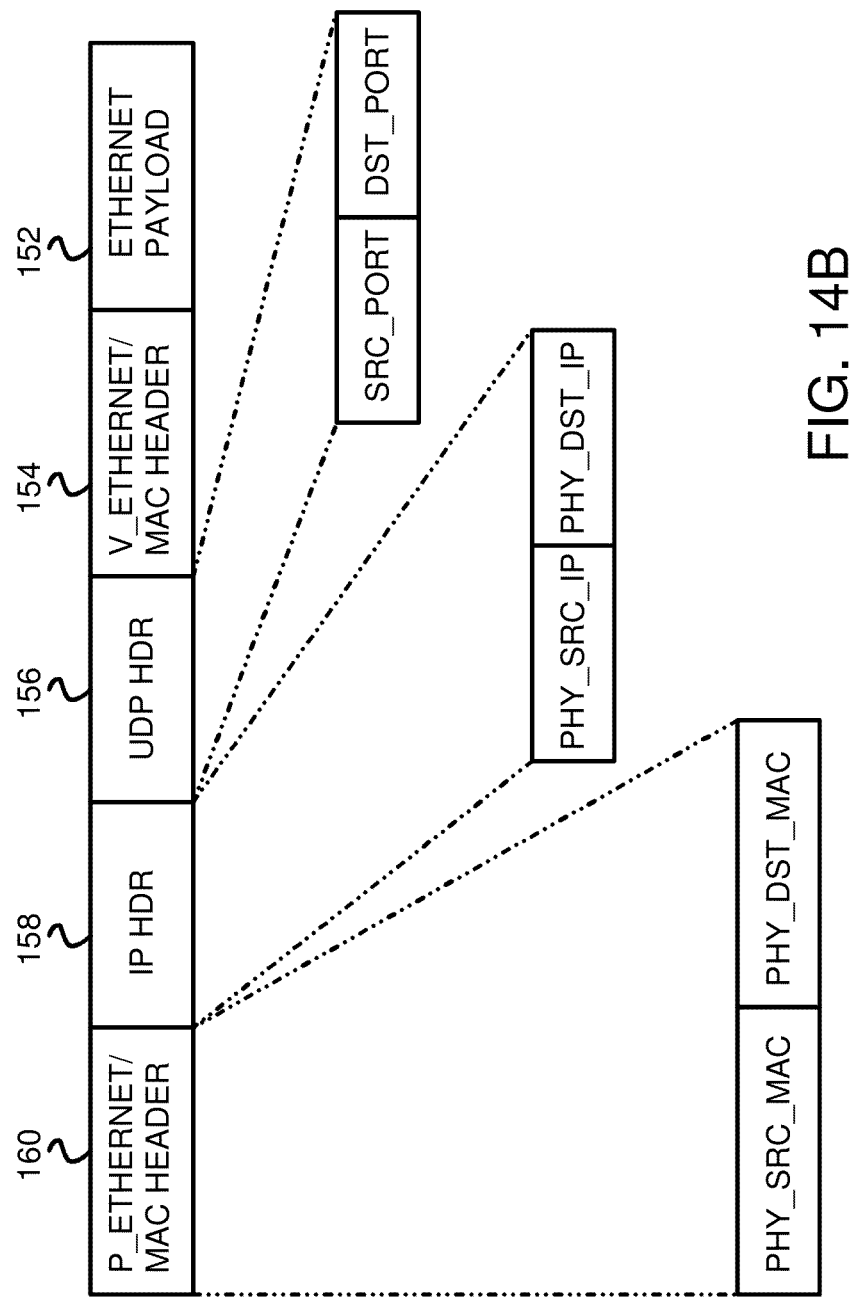

When network stack 48 sends the packet with the gateway's virtual MAC address VN1G-MAC, VN device driver shim 44 intercepts the packet and looks up the destination IP address in switch table 350. The gateway entry in VN1 switch table 50 may be used as a pointer to VN2 switch table 350. For single-hop routing, the final destination's physical IP address, TCP port, and physical MAC address are read from VN2 switch table 350 and sent to VN device driver shim 44, which encapsulates the virtual MAC frame with a physical IP packet (FIG. 14B).

VN device driver shim 44 also decrements the Time-To-Live (TTL) field in the virtual IP packet for each virtual router that the virtual-network packet passes through. The checksum for the virtual-network packet is also recalculated. Thus the virtual IP packet appears to have passed through one or more virtual routers, since the TTL field has been decremented. In reality though, the virtual routers do not exist.

VN device driver shim 44 then sends the physical IP packet to Ethernet NIC device 52, which forms the physical MAC frame for transmission over the physical local LAN. The packet is then routed physically by the Internet or other networks until it reaches the node with the physical IP address. Another VN device driver shim 44 at the destination extracts the virtual-network packet. The packet only need to be sent over the physical network once since the final destination is pre-calculated at the sending node.

Figure 9:
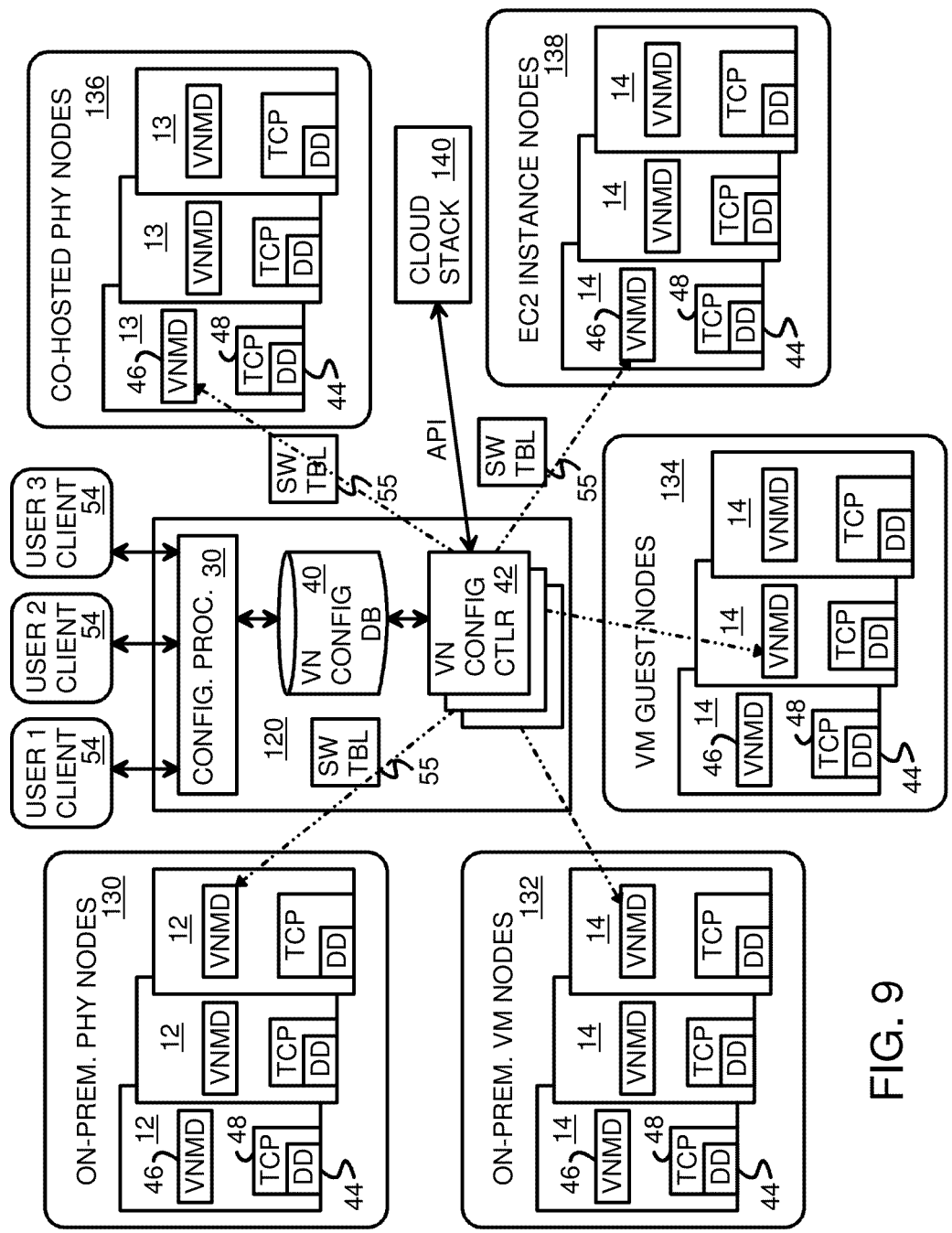
FIG. 9 highlights an updated switch table being broadcast to all nodes on a virtual network.

FIG. 9 highlights an updated switch table being broadcast to all nodes on a virtual network. When a subscriber configures a virtual network, such as by adding a new node, the request is entered into virtual-network configuration client 54 and sent over Internet 100 to virtual-network configuration process 30 in central on-demand VN configuration server 120. Virtual-network configuration process 30 authenticates the subscriber and creates a new node entry for the virtual network. The switch table for the virtual network is updated in VN configuration database 40.

Changes to VN configuration database 40 trigger VN configuration controller 42 to read the updated switch table and send updated switch table 55 to all nodes on the virtual network. In particular, updated switch table 55 is sent to virtual network management daemon 46 running in the user space on each physical node 12, hosted physical nodes 13, and VM nodes 14. Each node has its virtual network management daemon 46 over-write its local switch table, VN switch table 50 (not shown) in the kernel space.

When a virtual router is configured, and a new remote virtual network is now accessible from the original virtual network, updated switch table 55 includes switch table 350 with entries for the remote virtual network. A gateway entry for the original virtual network may also be added to updated switch table 55.

When applications running in nodes 12, 13, 14 send out TCP/IP packets, network stack 48 is activated and generates Ethernet frames. VN device driver shim 44 intercepts the Ethernet frames and searches updated VN switch table 55 for a matching entry, then encapsulates the virtual Ethernet frame in a new physical IP packet and Ethernet frame with the original frame as the payload and the physical IP and MAC addresses of the destination node.

Cloud stack 140 may be used as an alternative to user client 54 to access VN configuration controller 42 via programs that provide automation capabilities such as auto-scaling and operator-free administration and control.

Virtual network management daemon 46 and VN device driver shim 44 can be placed on a wide variety of nodes, including physical nodes 12 at on-premises physical nodes 130, VM nodes 14 running on-premises in virtual hosts at on-premises VM nodes 132, VM nodes 14 running off-premises in virtual hosts at VM guest nodes 134, physical nodes 13 running off-premises at co-hosted physical nodes 136, and VM nodes 14 running off-premises at EC2 instance nodes 138. One or more cloud computing providers or hosted server locations can provide some of these nodes, or all of these nodes, while other nodes may be located on-premises by the subscriber.

For example, Rackspace can be used for co-hosted physical nodes 13, while Amazon EC2 for off-premises VM nodes 14. Additional physical nodes 12 and VM nodes 14 could be located on-premises at an organization-owned location. The virtual network spans both physical and virtual-machine nodes, both on-premises and off-premises.

Figure 10:
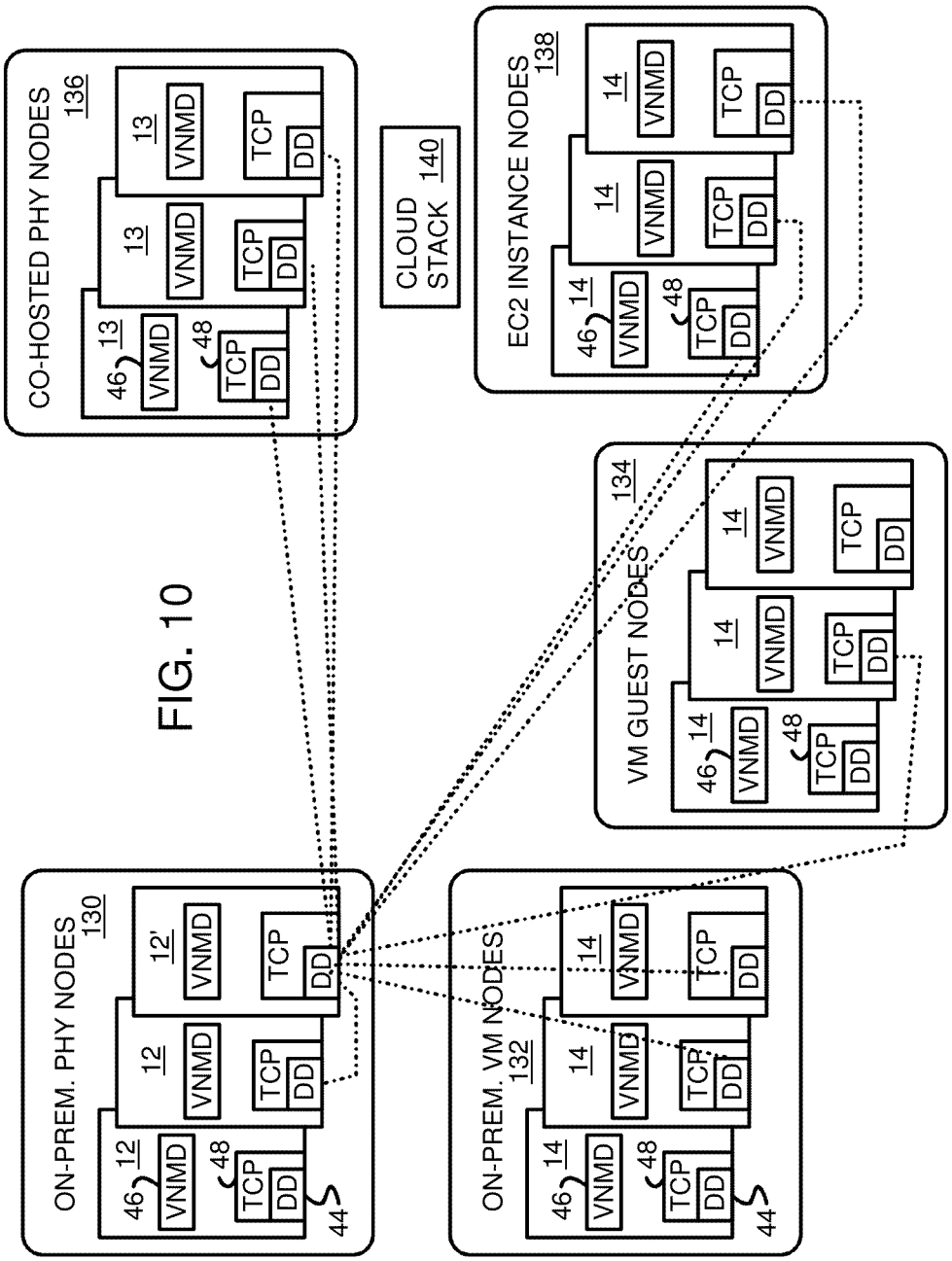
FIG. 10 shows one node connecting to other nodes on a virtual network.

FIG. 10 shows one node connecting to other nodes on a virtual network. Only the connections from one node are shown in FIG. 10. Each node in the virtual network is connected to all other nodes in the virtual network. VN switch table 50 (FIG. 6) contains entries for reaching all nodes in the virtual network. A copy of VN switch table 50 is stored on each node on the virtual network.

Once VN switch table 50 has been updated in each node in the virtual network, then virtual Ethernet frames may be transferred directly from one node to another in the virtual network in a point-to-point connection. The nodes do not have to get assistance from central on-demand VN configuration server 120 or from VN configuration controller 42. Thus networking performance is not degraded, except perhaps for a small delay by VN device driver shim 44. Since physical networks are used to physically transfer the data over the virtual network, the performance of the virtual network is about the same as that of the physical network.

The size of VN switch table 50 can be much smaller than for switching tables for the physical network. Each virtual network has a limited number of nodes.

The physical network can be much larger than the virtual network. For example, hosted-server location 106 and cloud-computing provider 108 may each have hundreds or thousands of subscribers, each with hundreds of nodes. The physical layer 2 switching tables for such large physical networks are so big that often IP routing at layer 3 is used which offers hierarchical addressing.

Figure 11:
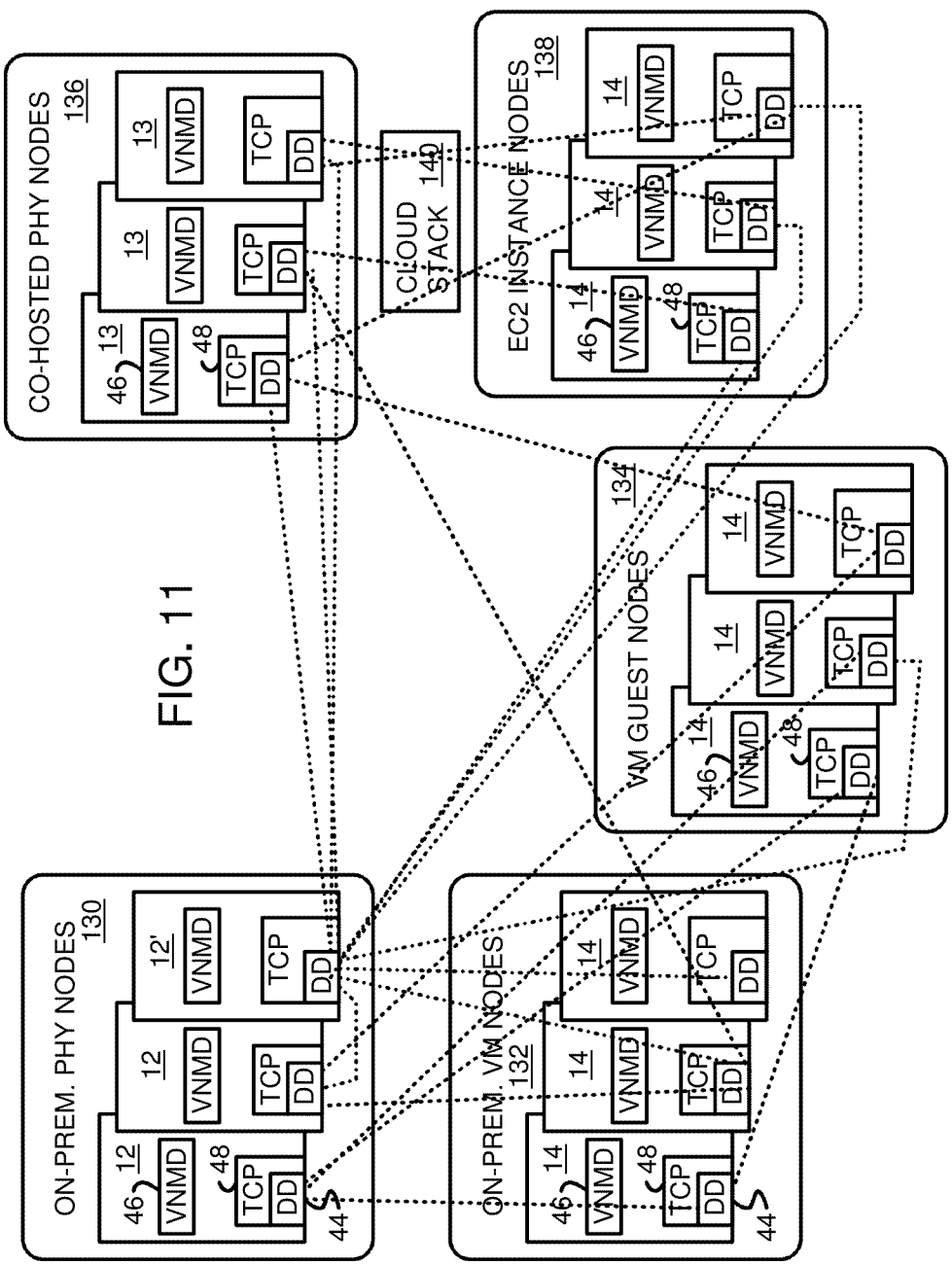
FIG. 11 shows a mesh of nodes connecting to other nodes on a virtual network.

FIG. 11 shows a mesh of nodes connecting to other nodes on a virtual network. The connections among several nodes are shown in FIG. 11. Each node in the virtual network is connected to all other nodes in the virtual network. VN switch table 50 contains entries for reaching all nodes in the virtual network. A copy of VN switch table 50 is stored on each node on the virtual network. The virtual network is a fully-meshed network, which is a faster topology than a hub-and-spokes arrangement often used for VPNs that span many organizations. When a virtual router is present, routes to a second virtual network pass through a virtual router (not shown).

The virtual network is fully meshed since each node has its own local VN switch table 50 with entries for forwarding packets directly to every other node on the virtual network. The number of unique paths in this fully meshed network is N squared minus N (or N*(N−1)), where N is the number of nodes in the networks. The packets do not have to go through a central hub node before being reaching the destination. Prior-art VPN tunnels are point-to-point links that may need to each be set up by hand (manually). The administrative overhead of manually setting up N*(N−1) VPN tunnels for a fully meshed network is prohibitive, and many organizations may fall back on a hub-and-spoke arrangement. With a hub-and-spoke arrangement, the number of paths equals N, the number of nodes in the network. The additional latency and performance bottleneck of the hub-and-spoke topology is avoided by the fully meshed virtual network, which is feasible since individual VPN tunnels do not have to be set up. And since the VN switch table 50 is identical for each of the nodes in the virtual network, the complexity of the problem collapses from N squared to N (i.e. linear).

Figure 12:
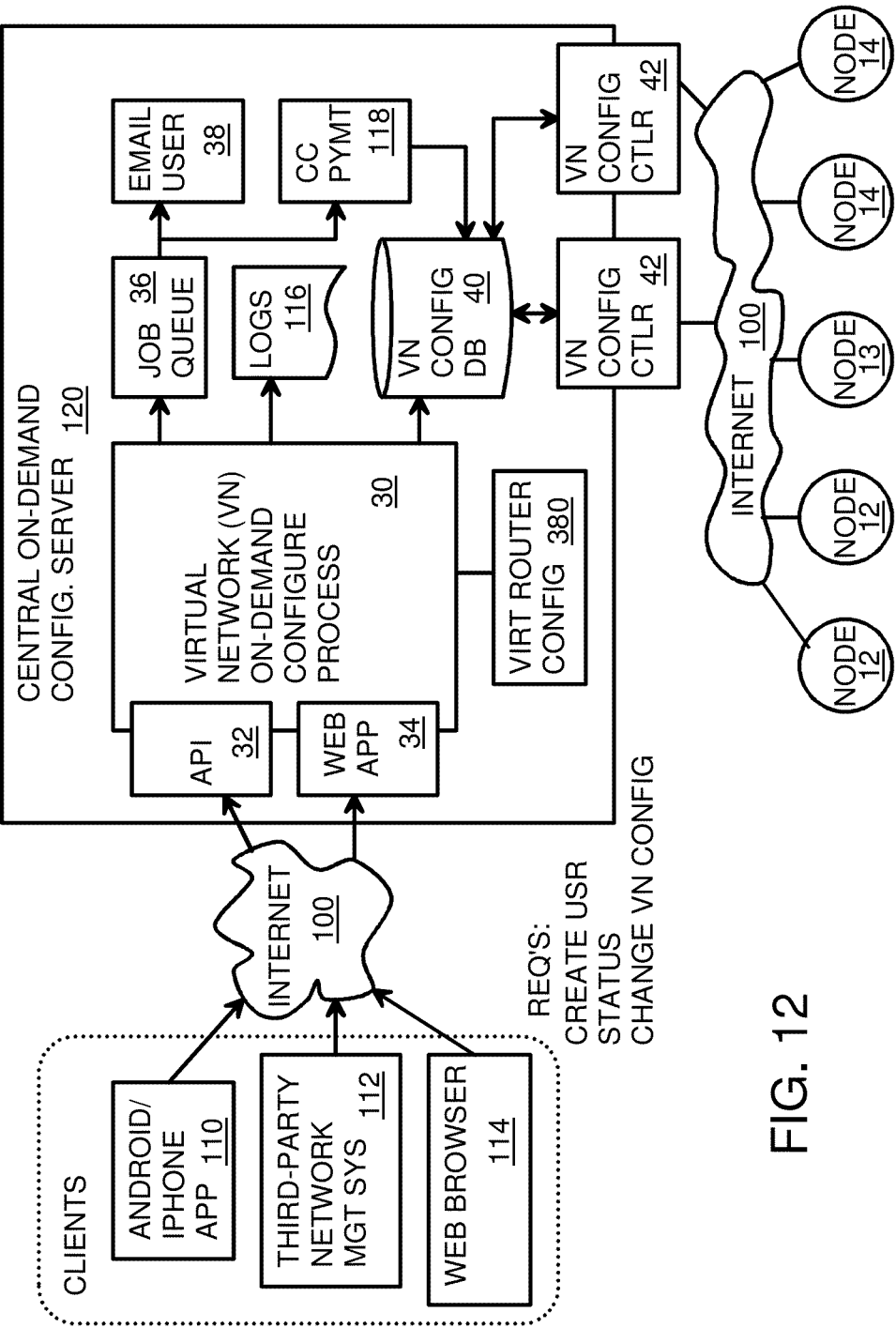
FIG. 12 shows on-demand virtual network configuration software used by an independent VN IaaS provider, or a cloud computing provider that offers virtual networking services.

FIG. 12 shows on-demand virtual network configuration software used by an independent VN IaaS provider, or a cloud computing provider that offers virtual networking services. Subscribers of the VN IaaS service send requests to configure a virtual network over Internet 100 to central on-demand VN configuration server 120. The IT staff at subscribing organizations uses client apps such as web browser 114, Android or iPhone apps 110, or third-party network management system 112 to generate these requests and to receive status reports and updates. Requests can include creating a new virtual network, inserting a virtual router, creating a new instance of VM node 14 to add to an existing virtual network, changing configuration of a virtual network, requesting status of a virtual network, adding new administrators, etc. A single subscriber may create many virtual networks rather than just one virtual network.

The client communicates with web app 34 or API 32 over Internet 100. Web app 34 is a web-based front-end application that provides an interface for clients to virtual-network configuration process 30 on central on-demand VN configuration server 120. API 32 is a front end application for non-web-based client applications.

Virtual-network configuration process 30 responds to requests from clients by creating and/or authenticating new users, changing network configurations, and/or sending back configuration and status reports. Changes to the configuration of the virtual network, such as the addition or deletion of nodes, are written into VN configuration database 40 by virtual-network configuration process 30.

When the user configures a virtual router, virtual router configuration sub-module 380 is activated. VN configuration controller 42 reads VN configuration database 40 for the second virtual network and adds entries for the second virtual network's switch table to the switch table (not shown) for a particular virtual network being connected to the virtual router. The updated switch table is then sent by VN configuration controller 42 over Internet 100 (and local LANs) to nodes on the all virtual networks connected to the virtual router, such as physical nodes 12, hosted physical nodes 13, and VM nodes 14. All of the nodes on the virtual networks connected by the new virtual router receive an updated switch table when the virtual router is configured, and later when a new node is added to any of the virtual networks connected by the virtual router.

The VN IaaS provider may bill the subscriber for the additional nodes that are added to a VN, or for adding the virtual router. If the VN service is being offered by a cloud computing provider they may also bill the subscriber for the additional processing and storage resources of the new node. When the virtual network is expanded by adding a new node, virtual-network configuration process 30 adds a new job to job queue 36 and logs the addition into logs 116. A credit-card or other accounting module such as payment module 118 is activated to bill the subscriber for the additional resources that the expanded virtual network requires, and the subscriber is emailed a notification for their record keeping by emailer 38. Payment module 118 may also periodically read VN configuration database 40 to determine what network resources are being made available during that period of time, and bill the subscriber for the time and resource.

VN configuration controller 42 is a software process that monitors and controls sets of nodes in a virtual network. VN configuration controller 42 may ping each node on the virtual network and process keepalive messages, as well as update network configurations. Ping may refer to an ICMP ping, or to any network-based mechanism to check the availability of a node. The nodes may also ping the controller.

An error module (not shown) may also be integrated with virtual-network configuration process 30. The error module could detect when an error occurs, such as when one of VN configuration controllers 42 reports that a node is off-line or not responding to pings, or when other network errors occur. While VN configuration database 40 represents the desired state of the virtual network, VN configuration controller 42 may detect that the actual state of the virtual network is deficient. Errors could be logged or emailed to the subscriber, or some kind or error processing or recovery process could be activated. The error module may also be used for configuration changes.

User Interface—FIG. 13

FIG. 13 shows a user interface for configuring a virtual router. When the subscriber organization desires to set up a virtual router, a screen is displayed to the subscriber such as that shown in FIG. 13. The screen shows all the networks that the subscriber has set up, and perhaps other networks that may be shared by other subscribers or other parties.

The subscriber can configure a virtual router by selecting one or more additional virtual networks to connect the current virtual network to. The subscriber selects a virtual network by activating check box 398 for that virtual network. Virtual router configuration sub-module 380 then activates virtual-network configuration process 30 (FIG. 12) to update VN switch table 50 for all virtual networks selected by the check boxes. The updated VN switch tables 50 have entries for the local virtual network, and for all other selected remote virtual networks, so that packets can be routed to the remote virtual networks. From the subscriber's point of view, the packets are being routed through a virtual router, but physically the packets are sent over the existing physical networks directly to the destination node.

Figure 14C:
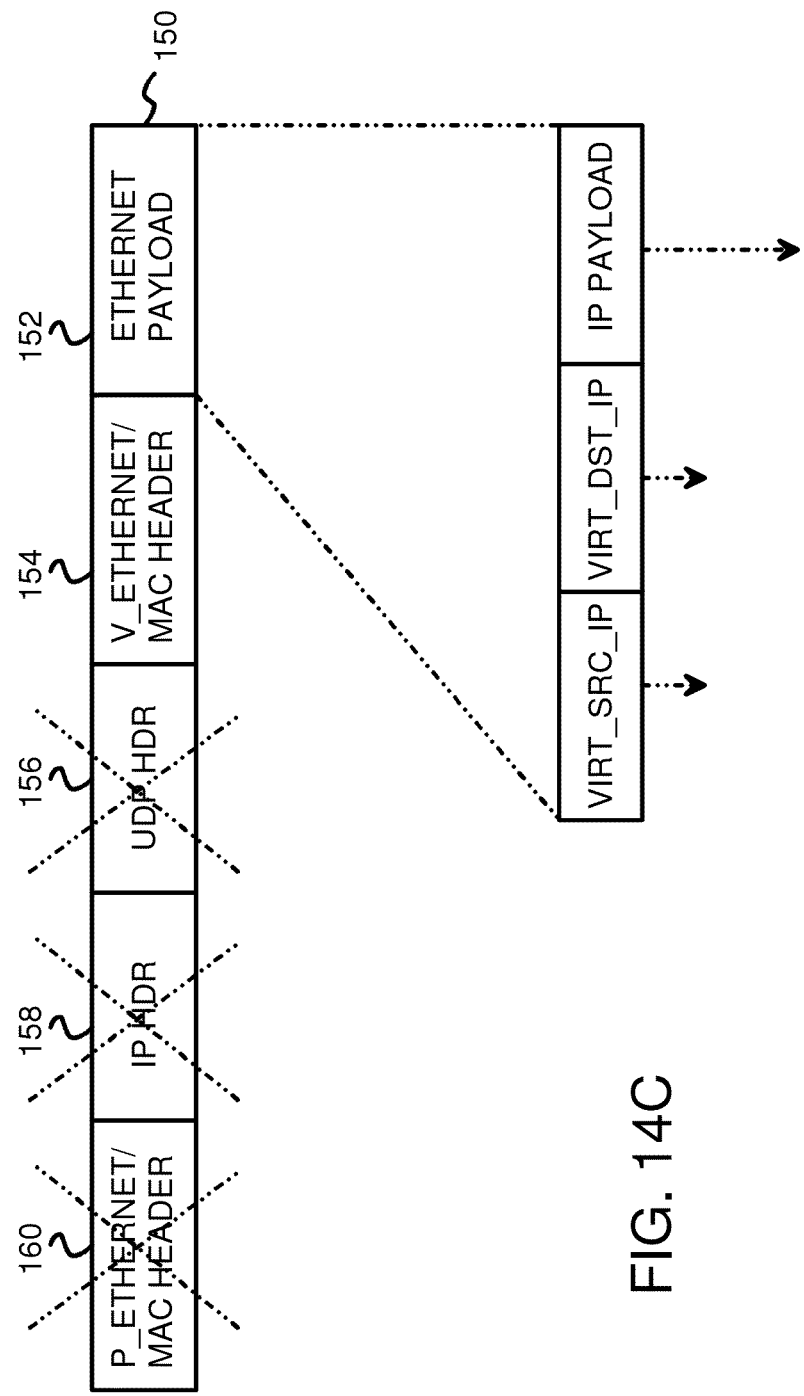

FIGS. 14A-C highlight encapsulation of a virtual-network packet with a physical packet when the virtual-network packet is passed through a virtual router. In FIG. 14A, an application program on a source node generates Ethernet payload 152, which includes the IP data payload, and an IP header. The IP header includes the virtual destination IP address, the virtual source IP address, a Time-To-Live (TTL) field, and a checksum. Virtual Ethernet header 154 is attached by network stack 48 (FIG. 7). Virtual Ethernet header 154 includes virtual source and destination MAC addresses. Other fields that are not shown may also be present in the header.

TTL Decremented for Virtual Router—FIG. 14A

Ethernet payload 152 also includes as part of the IP header a Time-To-Live (TTL) field and a checksum. The TTL field is a count that is decremented for each level-3 routing hop, such as through a level-3 router. When a virtual-network packet must pass through virtual router 330, the TTL field is decremented. A new checksum for the virtual-network packet is generated using the new value of the TTL field. This TTL decrementing and checksum regeneration can be performed by VN device driver shim 44 at the sending node. The TTL field can be reduced by the total number of virtual hops, rather than incrementally for each virtual hop.

Virtual Ethernet frame 150 is intercepted by VN device driver shim 44 after being generated by network stack 48 on the source node, and before being transmitted by NIC device 52. Thus the TTL and checksums are adjusted before packet transmission.

In FIG. 14B, VN device driver shim 44 pre-pends UDP header 156 to virtual Ethernet header 154 and Ethernet payload 152. UDP header 156 includes the source and destination UDP ports. The destination UDP port is read from VN switch table 50, while the source UDP port is pre-defined for the source node.

VN device driver shim 44 then attaches physical IP header 158, with the physical source and destination IP addresses. The physical destination IP address is read from VN switch table 50, while the physical source IP address is pre-defined for the source node.

Finally VN device driver shim 44 attaches physical Ethernet header 160, which includes physical source and destination MAC addresses. The physical source and destination MAC addresses are provided to the VN device driver shim 44 by the existing standard physical network infrastructure mechanisms.

The physical MAC addresses allow the Ethernet frame to be forwarded to the external switch on the organization's or service provider's LAN, while the physical IP addresses allow the embedded IP packet to be routed over the public Internet.

In FIG. 14C, the physical packet is stripped of headers at the destination node. Physical Ethernet header 160 is removed when the Ethernet frame exits the source node's LAN and enters the Internet. Another physical Ethernet header 160 may be attached when the packet enters the destination's LAN from the Internet. The destination UDP port is read from UDP header 156, and when the UDP port matches the UDP port used by VN device driver shim 44, it indicates that the packet routed over physical networks is a virtual network packet. Upon arrival at the destination node, physical Ethernet header 160 and physical IP header 158 are removed by VN device driver shim 44.

For example, all virtual network packets could have a UDP port of 8002, just like web browser packets typically use TCP port 80. UDP port 8002 identifies packets as being virtual network packets.

When the UDP port matches, VN device driver shim 44 recognizes that this packet is one of the tunneled encapsulated packets and needs to be unpacked. It removes the Ethernet header 160, the IP header and UDP header 156. The remaining fields in the packet, Virtual Ethernet header 154 and Ethernet payload 152, are passed up to network stack 48. Network stack 48 then sends the IP payload to the application identified to receive packets for the virtual IP address in Ethernet payload 152. For example, an application program that is a server app could receive all TCP packets sent to the virtual IP address on port 5000, or a load-balancing program could receive packets for virtual IP addresses and then distribute them uniformly across a server farm. A database application might receive packets at a virtual IP address from an application server that needs to access the database to process customer requests.

To network stack 48, virtual Ethernet frame 150 appears to be a standard Ethernet frame received over a LAN. Applications running on the node, and network stack 48, are unaware that the packet was routed over the Internet. It appears to these applications and to network stack 48 that the frame was forwarded over the organization's local LAN.

Figure 15:
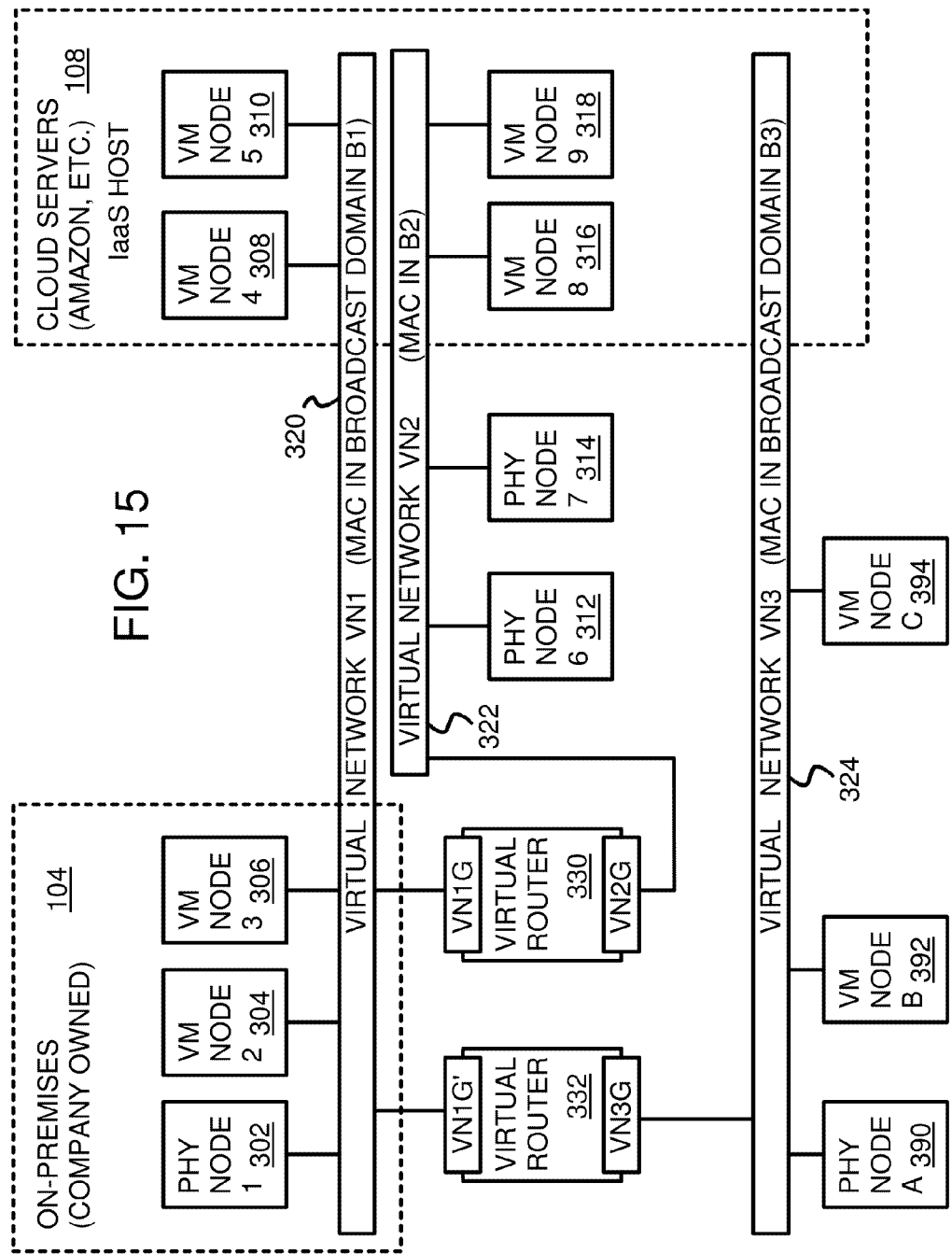
FIG. 15 shows multiple virtual routers that connect multiple virtual networks.

FIG. 15 shows multiple virtual routers that connect multiple virtual networks. Virtual router 330 connects virtual networks 320, 322, while a second virtual router 332 connects virtual networks 320, 324 (VN1 to VN3). Each virtual router has two gateway nodes that act as layer-2 endpoints, separating the layer-2 broadcast domains and virtual networks.

Figure 16:
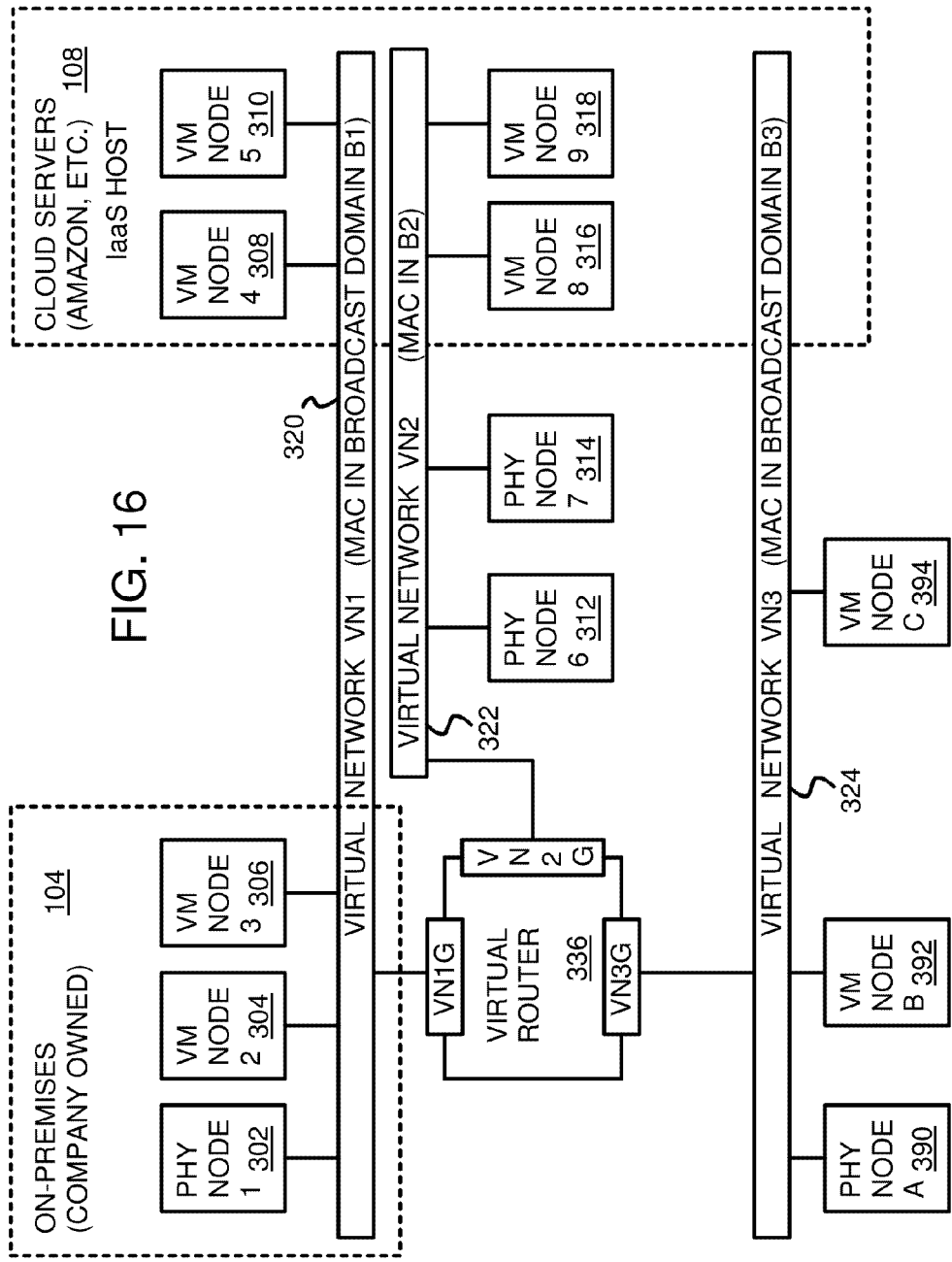
FIG. 16 shows a multi-port virtual router that connects multiple virtual networks.

FIG. 16 shows a multi-port virtual router that connects multiple virtual networks. Virtual router 336 connects multiple virtual networks 320, 322, 224 (VN1, VN2, VN3). Virtual router 336 has three gateway nodes that act as layer-2 endpoints, separating the layer-2 broadcast domains and virtual networks. Additional virtual routers and virtual routers with more ports could be added.

Alternate Embodiments

Several other embodiments are contemplated by the inventors. For example while a single virtual hop through a single virtual router has been described, there could be multiple virtual hops through several virtual routers. The TTL field in the virtual IP packet would be decreased by the number of virtual hops. There could be several levels of switch tables 50, 350 that are consulted in series to process virtual-network packets that pass through a series of virtual routers. Additional switch tables 350 could be added for additional virtual networks that are accessible through one or more virtual routers. A single switch table could be stored for several nodes or all nodes on the local network. Switch table stubs could be loaded on each node rather than the entire switch table. The switch table stubs could cache a portion of the switch table entries, and could access a larger shared switch table. A switch table stub could store no entries but fetch entries as needed from a centralized switch table.

Rather than store tables for all virtual networks that are reachable through virtual routers, remote switch tables could be fetched or looked up for destinations on seldomly-accessed virtual networks. A cache of switch tables 50, 350 could be stored locally that contains recently used routes, so that all entries for all virtual nodes do not have to be stored in switch tables 50, 350. Various table arrangements, levels, and caching could be used for switch tables 50, 350.

In a physical network, a routing table is consulted at each router to find the path to the next intermediate node (the next hop). However, since virtual routers are not real devices, hop-by-hop processing of packets does not occur. Instead, all packet processing that would occur along a virtual path through virtual routers is performed at the source node. An initial hop from the source node to a gateway on a first virtual router may consult a first switch table 50 with local entries on the local virtual network. Then a second switch table 350 is consulted for the next hop from the first virtual router to a node on the second virtual network.

If the node on the second network was a gateway node on a second virtual router, then a third switch table 350' could be consulted for a third hop from the second virtual router to a node on a third virtual network. If the node on the third network was a gateway node on a third virtual router, then a fourth switch table 350" could be consulted for a fourth hop from the third virtual router to a node on a fourth virtual network. The destination's physical IP and MAC addresses and any intermediate routing information, such as the number of hops to the destination node on the fourth virtual network could be cached as part of a top-level switch table 50 for future packets to the same node on the fourth network. Security filtering rules for each hop, port spanning, logging, etc, could be cached for each virtual router or virtual hop.

The number of virtual hops for the virtual-network packet may not be related to the number of physical hops over the real physical network. The physical packet may be tunneled directly to the destination's physical node such as by IP tunneling, or may be routed through several layer-3 routers or other physical network devices.

IEEE 802.1Q is a virtualized LAN standard known as a VLAN. A VLAN uses extra tag bits in the Ethernet header to specify a portion of a LAN as a sub-network segment. Thus a VLAN merely divides an existing LAN into smaller virtual LANs that are separate from one another and define their own 'broadcast domain'. Separating LANs into smaller VLANs can improve LAN performance since certain kinds of traffic can be contained within a single broadcast domain. A virtual network as described herein can span several physical networks and is unrelated to a VLAN.

Routing table 344 can have an entry for the gateway node of the virtual router, or a default entry or result can send packets with no matching address entry in the table to a default gateway. Default entries could also be added to switch table 50.

ARP cache 340 may not be a cache but rather an ARP process that is activated to find the MAC address for an IP address. VN device driver shim 44, virtual network management daemon 46, or some other module may be activated to intercept the ARP process when the IP address matches the gateway IP address for the virtual router. The intercepting process then returns the virtual MAC address for the gateway to the network stack. Other plugins to the ARP process could be used to provide the gateway address.

In FIG. 6, note that the same destination virtual MAC address can theoretically exist on two different virtual networks. The physical MAC address does not need to be stored in VN switch table 50 for the transmitting node since it is the MAC address of the next device (hop) after the NIC attached to the transmitting node. This MAC address is retrieved and inserted as necessary by the networking stack 48 and/or Ethernet NIC device 52 (FIG. 7).

FIG. 7 shows a single VN device driver shim 44 for a single Ethernet NIC device 52. However, there could be several VN device driver shims 44 connected to several Ethernet NIC devices 52. Separate VN device driver shims 44 may be provided for each NIC device 52. Alternately, a single muxing VN device driver shim could connect to several Ethernet NIC devices 52. A muxing VN device driver shim is placed below network stack 48. The muxing VN device driver shim 44 determines which one of NIC devices 52 to send the Ethernet frame to, based on the routing information configured in the node.

The TTL and checksums could be adjusted by the receiving node's VN device driver shim 44 after the packet has been physically routed, rather than before packet transmission as described earlier.

One VN configuration controller 42 could control one node, or several nodes. A single VN configuration controller 42 could control several different virtual networks rather than just one virtual network. A single VN configuration controller 42 could also support many subscribers. A single subscriber might require more than one configuration controller to support all of their virtual networks. The central server software could be run on premises for in-house use.

While IP packets have been described as being sent as the payload of the virtual frame, other Ethernet payloads could be used other than IP packets. While Ethernet LANs have been described as the layer-2 physical network, other layer-2 physical networks could be used such as token ring.

In another optimization or alternate embodiment, the node-ID and MAC address are one and the same, saving one column in switch table 50 and thus also saving some memory. Since a node can have multiple interfaces, multiple identifiers may point to the same node, which can be handled by those with skill in the art.

Encapsulation as shown in FIG. 14 may vary. For example, the full virtual MAC addresses in virtual Ethernet header 154 does not have to be transmitted in the physical packets, saving bandwidth. The virtual MAC addresses may be re-generated at the destination from VN switch table 50. While UDP has been shown to encapsulate packets, a TCP header could be used rather than UDP header 156. A faked TCP connection could also be used. Raw IP packets could be sent to a dedicated IP address as another way to eliminate the need for UDP header 156. The packet payload could be encrypted. IPsec could be used. A non-IP protocol could be used for encapsulation, such as IPX or a proprietary protocol. The protocol may be indicated by a field in the MAC header. When specialized routing equipment is used, IP could be replaced with MultiProtocol Label Switching (MPLS) or Virtual Private LAN Service (VPLS). Rather than encapsulate frames, translation or re-mapping of addresses could be employed.

Various programming tools and languages may be used to implement the various software modules. For example, virtual-network configuration process 30 may be constructed as a web application using any of the popular application development frameworks such as Django, Ruby on Rails or PHP. Data structures such as tables can be implemented in a wide variety of ways with many variations, such as trees, sorted tables, databases, etc. Components such as central on-demand VN configuration server 120, virtual-network configuration process 30, and virtual router configuration sub-module 380 could be implemented in a variety of ways. VN configuration controller 42, VN device driver shim 44, virtual network management daemon 46, etc. can be implemented in software, firmware, or hardware using modules, routines, programming objects, etc. Some components are optional such as job queue 36 and a cloud stack. It should be understood that the actual implementation of on-demand VN configuration server 120 and the central management server can be completely different, such as in the form of a distributed system.

While virtual-private-network (VPN) tunnels are not needed to implement virtual networks, VPN tunnels could be used as part of the physical network that virtual networks are overlaid upon. LAN bridges, proxies, and gateways could also be part of the routing paths of the underlying physical network. Various applications-programming interfaces (APIs) may be used.

While using VN device driver shim 44 is desirable for performance reasons, a user space driver derived from TUN or TAP drivers could replace VN device driver shim 44. The TAP driver is placed on top of network stack 48 and straddles both the user and kernel spaces. The TAP driver is useful for prototyping and quick development as well as simple debugging, but has poor performance since context switches are required for each IP packet.

While VN switch tables 50, 350 have been described as being in the kernel space, one or more tables could be located in the user space, such as for remote virtual networks (table 350). Likewise shim 44 could be in the user space rather than in the kernel space. Virtual network management daemon 46 may be implemented in the kernel or in the user space. VN device driver shim 44 could be loaded at initialization rather than later. The random MAC address could be created by VN configuration controller 42 and sent to the node. Other modifications to the flow and processes are possible.

Some modules or components could be merged or split. For example, virtual network management daemon 46 and VN device driver shim 44 could be merged into a user or a kernel space component, or each could be divided into several smaller units. UDP or TCP ports do not have to be stored in the tables, but could be implicit or the same for all nodes. Other fields could be added, such as a protocol identifier field (UDP or TCP for example). The data produced by applications 122 (FIG. 7) may be encapsulated into network packets. Each packet may have multiple headers, provided by different levels in the network stack. For example, user data may be broken into packet with a TCP header, each of which is wrapped into an IP packet with an IP header and finally into an Ethernet frame with its own header.

The use of on premises nodes is not a requirement. Virtual networks may be configured to connect nodes that are entirely off premises within cloud computing provider 108 or hosted server location 106, or between these locations. Nodes can refer to physical machines, or to virtual nodes on a physical machine. The virtual router has virtual interfaces.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method comprising:

storing in each node in a first virtual network, address information for nodes on the first virtual network, the address information including a virtual network (VN) address and a physical network address for each node on the first virtual network;

sending, by a network stack in a node on the first virtual network, data to an application executing on the node when a virtual network address of an incoming packet matches a virtual network address of the node, and the network stack receiving data from the application and sending the data to a virtual network address specified by the application;

interfacing the node to a physical local-area network by a network interface controller (NIC), for receiving data matching a physical network address for the node, and for sending data to a physical network address;

intercepting with a VN device driver shim between the network stack and the NIC, data between the network stack and the NIC, including intercepting a virtual network address from the network stack; and encapsulating data sent to virtual network addresses of the network stack using physical network addresses of the physical local-area network by referring to the address information stored in the node, wherein the nodes on the first virtual network include physical nodes located on a physical local-area network operated by a subscriber and not open to users from a general public, and virtual-machine nodes located on an internal provider network operated by a cloud computing provider and open to users from the general public.

2. The method of claim 1, wherein storing further comprises storing local entries for nodes on the first virtual network and remote entries for nodes on a second virtual network.

3. The method of claim 2, further comprising:
when the intercepted virtual network address is for a node in the second virtual network, decrementing a Time-To-Live (TTL) field in a virtual-network packet to generate a decremented TTL field, and recalculating a checksum for the virtual-network packet using the decremented TTL field.

4. The method of claim 1, wherein the first virtual network is a virtual layer-2 network and each virtual network address is a layer-2 network address and each physical network address is a layer-3 network address.

5. The method of claim 1, wherein the physical local-area network is an Ethernet network and the physical network addresses of the physical local-area network are Media-Access-Controller (MAC) addresses.

6. The method of claim 1, wherein the first virtual network is overlaid upon a plurality of physical networks including the Internet that routes data using a layer-3 Internet Protocol (IP) network address and the physical local-area network that routes data using a layer-2 physical network address, wherein the physical local-area network is connected to the Internet.

7. The method of claim 1, further comprising:
creating and destroying virtual-machine nodes in response to demand for access to applications.

8. The method of claim 1, further comprising:
storing a virtual gateway address of a virtual router in the first virtual network; and the network stack reading the virtual gateway address when the virtual network address is for a node on a second virtual network, and generating a virtual frame configured to be routed to the virtual gateway address when the virtual network address is for a node on the second virtual network.

9. The method of claim 8, further comprising:
receiving a request for the virtual gateway address from the network stack; and
sending a virtual gateway media access control (MAC) address to the network stack, the network stack including the virtual gateway MAC address in the virtual frame.

10. An apparatus comprising:
a network interface controller (NIC) configured to transmit a physical frame over a physical local area network to a physical network address on behalf of a node in the network;
memory configured to store, for all nodes on a first virtual network, virtual network addresses and physical network addresses, wherein the nodes on the first virtual network include physical nodes located on a physical local-area network operated by a subscriber and not open to users from a general public, and virtual-machine nodes located on an internal provider network operated by a cloud computing provider and open to users from the general public;
a network stack configured to receive data and a virtual network address from an application running on the node and to generate a virtual frame from the data and the virtual network address; and
a device driver shim configured to intercept the virtual frame from the network stack, search the memory for the virtual network address, generate a physical header with the physical network address generated using a translation from information stored in the memory, and send the physical frame to the NIC by attaching the physical header to the virtual frame.

11. The apparatus of claim 10, wherein the memory is further configured to store a virtual gateway address of a virtual router in the first virtual network, and the network stack is configured to read the virtual gateway address when the virtual network address is for a node on a second virtual network, and to generate the virtual frame configured to be routed to the virtual gateway address when the virtual network address is for a node on the second virtual network.

12. The apparatus of claim 11, further comprising:
an Address Resolution Protocol (ARP) module configured to receive a request for the virtual gateway address from the network stack and to sends a virtual gateway media access control (MAC) address to the network stack, the network stack including the virtual gateway MAC address in the virtual frame.

13. The apparatus of claim 12, wherein the ARP module is an ARP cache that stores a gateway entry having the virtual gateway address and the virtual gateway MAC address.

14. The apparatus of claim 13, wherein the gateway entry is written to the ARP cache when the virtual router is added.

15. A system comprising the apparatus of claim 10, and further comprising:
a virtual network (VN) configuration server configured to authenticate the subscriber among a plurality of subscribers and to receive a configuration request from the subscriber to add a virtual router between a first plurality of nodes in the first virtual network for the subscriber;
a configuration database configured to store virtual-network configurations for a plurality of virtual networks for the plurality of subscribers, including configurations for the first virtual network;
a virtual-network configuration process on the VN configuration server configured to update a virtual-network configuration for the subscriber in response to the configuration request; and
a configuration controller configured to generate an updated virtual-network configuration when the VN configuration database is updated by the virtual-network configuration process, the configuration controller configured to broadcast the updated virtual-network configuration to a plurality of virtual-machine nodes in the first virtual network for the subscriber.

16. A system comprising:
a virtual-network configuration process, activated by a subscriber, that configures a virtual network for the subscriber;
a virtual network (VN) configuration database that stores a plurality of virtual network configurations for a plurality of subscribers, wherein the virtual-network configuration process updates a virtual-network configuration in the VN configuration database in response to the subscriber configuring the virtual network;

a configuration controller configured to send an updated virtual-network configuration to nodes on the virtual network, wherein the updated virtual-network configuration includes local entries for nodes on the virtual network, and remote entries for nodes on a remote virtual network;

a virtual router that connects the virtual network to the remote virtual network in response to the subscriber configuring the virtual router;

a payment processor configured to generate billing items for billing the plurality of subscribers for virtual networks;

wherein each node on the virtual network includes:
- a local VN switch table that stores virtual and physical network addresses for nodes on the virtual network;
- a remote VN switch table that stores virtual and physical network addresses for nodes on the remote virtual network;
- a network stack that receives data and a virtual network address from an application running on a node on the virtual network, and that generates a layer-2 virtual frame;
- a network interface controller (NIC) configured to send a physical frame over a provider local network to a physical network address; and
- a device driver shim, coupled between the network stack and the NIC, and configured to read the local VN switch table, in order to encapsulate the layer-2 virtual frame using a physical network address for a destination node on the virtual network to generate the physical frame.

17. The system of claim 16, further comprising:
a virtual routing process, activated when the destination node is on the remote virtual network, to read the remote VN switch table for the physical network address for the destination node on the remote virtual network;
wherein the device driver shim is configured to encapsulate the layer-2 virtual frame using the physical network address for the destination node on the remote virtual network to generate the physical frame.

18. The system of claim 16, wherein each node on the virtual network includes a virtual network management daemon that receives the updated virtual network configuration from the configuration controller, and writes updates to the local VN switch table and to the remote VN switch table.

19. The system of claim 16, wherein the virtual network further comprises physical nodes that are physical server machines located on a premises of the subscriber, and connected to a physical local-area network operated by the subscriber, and the virtual network spans virtual and physical nodes on-premises and off premises.

20. The system of claim 16, wherein each node on the virtual network further comprises a virtual routing table, accessed by the network stack, to provide a gateway virtual network address that is a virtual address of the virtual router when the virtual network address is an address of a node on the remote virtual network.

21. The system of claim 16, wherein the local VN switch table further comprises a gateway entry for a gateway node on the virtual network, the gateway entry being accessed when the destination node is on the remote virtual network, the gateway entry causing a lookup in the remote VN switch table to obtain the physical network address, whereby the gateway entry links the local VN switch table to the remote VN switch table.

22. The system of claim 16, further comprising:
a cloud computing provider that is configured to provide virtual-machine nodes running on a plurality of servers connected to a provider local network that is connected to an Internet, the cloud computing provider configured to rent processing time on the plurality of servers to the plurality of subscribers by creating the virtual machine nodes on the plurality of servers.

23. A system comprising:
a physical network including a plurality of physical nodes and at least one of the plurality of physical nodes comprising:
- a virtual network (VN) configuration database configured to store virtual network addresses and physical network addresses for a plurality of nodes in a first virtual network and in a second virtual network;
- a virtual-network configuration process, coupled to receive network-configuration requests from a client operated by a subscriber, and configured to write a new virtual network address and a new physical network address for a new node being added to the first virtual network;
- a virtual-router configuration process, coupled to receive a virtual router configuration request from the client, and configured to write a gateway virtual network address for a virtual router that connects the first virtual network to the second virtual network;
wherein applications executing on the new node send data to other nodes in the first virtual network using the virtual network addresses and receive data from the first virtual network addressed to the new virtual network address, and send data to nodes in the second virtual network using the gateway virtual network address and receive data from a node in the second virtual network addressed to the new virtual network address;
- a shared VN switch table, accessible by each node in the first virtual network, the shared VN switch table configured to store entries for nodes on the first virtual network and on the second virtual network, the entries storing a virtual network address and a physical network address for each node on the first virtual network and for each node on the second virtual network;
- a plurality of VN switch table stubs, wherein a VN switch table stub is stored on a node in the first virtual network, the VN switch table stub configured to access the shared VN switch table; and
- a configuration controller, activated by the virtual-network configuration process when the VN configuration database is updated, the configuration controller configured to send updates of the VN configuration database to the shared VN switch table for the first virtual network.

24. The system of claim 23, further comprising:
a virtual network management daemon running on a node having the shared VN switch table, wherein the virtual network management daemon receives the updates from the configuration controller and writes the updates to the shared VN switch table.

25. The system of claim 23, wherein each node in the plurality of nodes on the first virtual network further comprises:
- a network stack configured to send data to an application executing on a node when a virtual network address of an incoming packet matches a virtual network address of the node, and to receive data from the application and send the data to a virtual network address specified by the application;

a network interface controller (NIC), coupled to a physical local-area network, and configured to receive data matching a physical network address for the node, and to send data to a physical network address; and a device driver shim between the network stack and the NIC, the device driver shim configured to intercept data between the network stack and the NIC, and to shim intercept a virtual network address from the network stack and, based on data stored in the shared VN switch table, encapsulate data with a physical network address sent to the NIC using the VN switch table stub or the shared VN switch table.

* * * * *